(12) United States Patent
Yoshino et al.

(10) Patent No.: US 7,837,558 B2
(45) Date of Patent: Nov. 23, 2010

(54) GAME CONSOLE AND EMULATOR FOR THE GAME CONSOLE

(75) Inventors: Hiroshi Yoshino, Kyoto (JP); Keizo Ohta, Kyoto (JP); Yoshitaka Yasumoto, Kyoto (JP); Kenji Nishida, Kyoto (JP); Kenichi Sugino, Kyoto (JP); Masato Ibuki, Kyoto (JP); Teruki Murakawa, Kyoto (JP); Soichi Yamamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1454 days.

(21) Appl. No.: 11/126,387

(22) Filed: May 11, 2005

(65) Prior Publication Data

US 2006/0100021 A1    May 11, 2006

Related U.S. Application Data

(63) Continuation-in-part of application No. 11/111,985, filed on Apr. 22, 2005, which is a continuation-in-part of application No. 10/921,957, filed on Aug. 20, 2004.

(30) Foreign Application Priority Data

Mar. 31, 2004    (JP)    ............................. 2004-106874

(51) Int. Cl.
    *A63F 9/24* (2006.01)
(52) U.S. Cl. .......................... 463/32; 345/501; 345/503
(58) Field of Classification Search ...................... 463/1, 463/43–47; 345/501–503, 530–532
    See application file for complete search history.

(56) References Cited

U.S. PATENT DOCUMENTS

| 4,204,728 | A |   | 5/1980  | Goshima et al. |
| 4,384,326 | A | * | 5/1983  | Devchoudhury ............ 711/163 |
| 4,432,067 | A | * | 2/1984  | Nielsen ........................ 463/44 |
| 4,481,529 | A |   | 11/1984 | Kerling |
| 4,516,777 | A |   | 5/1985  | Nikora |
| 4,542,903 | A |   | 9/1985  | Yokoi et al. |
| 4,628,304 | A |   | 12/1986 | Bottiau |
| 4,703,318 | A |   | 10/1987 | Haggerty |
| 4,811,205 | A | * | 3/1989  | Normington et al. ......... 345/502 |
| 4,865,321 | A |   | 9/1989  | Nakagawa et al. |
| 4,922,420 | A |   | 5/1990  | Nakagawa et al. |
| 4,924,413 | A |   | 5/1990  | Suwannukul |

(Continued)

FOREIGN PATENT DOCUMENTS

EP    0 960 637    12/1999

(Continued)

OTHER PUBLICATIONS

Computer Closet Collection, NEC Turbo Express, printed from wysiwyg://22/http://www.geocities.com/.about.compcloset/ NECTurboExpress.htm on Sep. 28, 2000 (2 pages), copyright 1997-1999, last modified Jun. 24, 1999.

(Continued)

*Primary Examiner*—Pierre E Elisca
(74) *Attorney, Agent, or Firm*—Nixon & Vanderhye P.C.

(57) ABSTRACT

A portable game system includes two display screens, at least one of which is touch-sensitive. A memory card is selectively connectable to the portable game system.

4 Claims, 32 Drawing Sheets

U.S. PATENT DOCUMENTS

| | | | |
|---|---|---|---|
| 4,931,860 A | 6/1990 | Narumiya | |
| 4,977,398 A | 12/1990 | Pleva et al. | |
| 4,979,738 A | 12/1990 | Frederiksen | |
| 4,981,296 A | 1/1991 | Shiraishi et al. | |
| 4,984,193 A | 1/1991 | Nakagawa | |
| 5,023,603 A | 6/1991 | Wakimoto et al. | |
| 5,095,798 A | 3/1992 | Okada et al. | |
| 5,109,504 A | 4/1992 | Littleton | |
| 5,112,051 A * | 5/1992 | Darling et al. | 463/45 |
| 5,134,391 A | 7/1992 | Okada | |
| 5,155,380 A | 10/1992 | Hwang et al. | |
| 5,161,803 A | 11/1992 | Ohara | |
| 5,184,830 A | 2/1993 | Okada et al. | |
| 5,207,426 A | 5/1993 | Inoue et al. | |
| 5,238,250 A | 8/1993 | Leung et al. | |
| 5,245,327 A | 9/1993 | Pleva et al. | |
| 5,265,888 A | 11/1993 | Yamamoto et al. | |
| 5,300,944 A | 4/1994 | Shapiro et al. | |
| 5,321,811 A * | 6/1994 | Kato et al. | 345/520 |
| 5,327,158 A | 7/1994 | Takahashi et al. | |
| 5,371,512 A | 12/1994 | Otake et al. | |
| 5,395,112 A * | 3/1995 | Darling | 463/44 |
| 5,400,053 A | 3/1995 | Johary et al. | |
| 5,412,800 A | 5/1995 | Bril et al. | |
| 5,422,375 A | 6/1995 | Rytter et al. | |
| 5,453,763 A | 9/1995 | Nakagawa et al. | |
| 5,495,266 A | 2/1996 | Otake et al. | |
| 5,509,663 A | 4/1996 | Otake et al. | |
| 5,552,799 A | 9/1996 | Hashiguchi | |
| 5,556,108 A | 9/1996 | Nagano et al. | |
| 5,559,954 A | 9/1996 | Sakoda et al. | |
| 5,592,651 A | 1/1997 | Rackman | |
| 5,603,064 A | 2/1997 | Bennett | |
| 5,608,424 A | 3/1997 | Takahashi et al. | |
| 5,617,546 A | 4/1997 | Shih et al. | |
| RE35,520 E | 5/1997 | Darling et al. | |
| 5,659,673 A | 8/1997 | Nonoshita | |
| 5,708,457 A | 1/1998 | Otake et al. | |
| 5,714,981 A | 2/1998 | Scott-Jackson et al. | |
| 5,759,104 A | 6/1998 | Shirae et al. | |
| 5,768,608 A | 6/1998 | Nakamura | |
| 5,770,533 A | 6/1998 | Franchi | |
| 5,785,598 A | 7/1998 | Hsu | |
| 5,790,096 A | 8/1998 | Hill, Jr. | |
| 5,793,351 A | 8/1998 | Leach | |
| 5,808,591 A | 9/1998 | Mantani | |
| 5,844,532 A | 12/1998 | Silverbrook et al. | |
| 5,854,620 A | 12/1998 | Mills et al. | |
| 5,892,939 A | 4/1999 | Call et al. | |
| 5,949,985 A | 9/1999 | Dahl et al. | |
| 5,954,808 A | 9/1999 | Paul | |
| 5,959,596 A | 9/1999 | McCarten et al. | |
| 6,020,751 A | 2/2000 | Rampone et al. | |
| 6,042,478 A * | 3/2000 | Ng | 463/44 |
| 6,047,373 A | 4/2000 | Hall et al. | |
| 6,052,794 A | 4/2000 | Polzin et al. | |
| 6,109,939 A | 8/2000 | Kondo et al. | |
| 6,115,054 A | 9/2000 | Giles | |
| 6,132,315 A | 10/2000 | Miyamoto et al. | |
| 6,170,743 B1 | 1/2001 | Okaue et al. | |
| 6,199,756 B1 | 3/2001 | Kondo et al. | |
| 6,200,216 B1 | 3/2001 | Peppel | |
| 6,209,043 B1 | 3/2001 | Sanemitsu | |
| 6,215,459 B1 | 4/2001 | Reddy et al. | |
| 6,243,654 B1 * | 6/2001 | Johnson et al. | 702/85 |
| 6,295,206 B1 | 9/2001 | Kondo et al. | |
| 6,311,246 B1 | 10/2001 | Wegner et al. | |
| 6,315,669 B1 | 11/2001 | Okada et al. | |
| 6,322,447 B1 | 11/2001 | Okada et al. | |
| 6,334,815 B2 | 1/2002 | Miyamoto et al. | |
| 6,341,728 B1 | 1/2002 | Kondo et al. | |
| 6,361,369 B1 | 3/2002 | Kondo et al. | |
| 6,424,348 B2 * | 7/2002 | Parikh et al. | 345/522 |
| 6,466,218 B2 * | 10/2002 | Parikh et al. | 345/522 |
| 6,480,929 B1 | 11/2002 | Gauthier et al. | |
| 6,522,309 B1 | 2/2003 | Weber | |
| 6,609,977 B1 | 8/2003 | Shimizu et al. | |
| 6,616,053 B2 | 9/2003 | Kondo et al. | |
| 6,669,487 B1 | 12/2003 | Nishizawa et al. | |
| 6,672,963 B1 | 1/2004 | Link | |
| 6,716,103 B1 | 4/2004 | Eck et al. | |
| 6,729,548 B2 | 5/2004 | Kondo et al. | |
| 6,743,104 B1 * | 6/2004 | Ota et al. | 463/44 |
| 6,783,076 B2 | 8/2004 | Kondo et al. | |
| 6,786,417 B1 | 9/2004 | Kondo et al. | |
| 6,810,463 B2 | 10/2004 | Okada et al. | |
| 6,821,204 B2 | 11/2004 | Aonuma et al. | |
| 7,066,394 B2 | 6/2006 | Kondo et al. | |
| 7,134,960 B1 | 11/2006 | Shimizu et al. | |
| 7,338,376 B2 * | 3/2008 | Eck et al. | 463/42 |
| 7,445,549 B1 * | 11/2008 | Best | 463/32 |
| 7,445,551 B1 | 11/2008 | Okada et al. | |
| 7,575,168 B2 * | 8/2009 | Suomela et al. | 235/462.01 |
| 2001/0047452 A1 | 11/2001 | Okada | |
| 2002/0045484 A1 * | 4/2002 | Eck et al. | 463/42 |
| 2002/0050999 A1 * | 5/2002 | San et al. | 345/530 |
| 2002/0151360 A1 | 10/2002 | Durham | |
| 2004/0157664 A1 | 8/2004 | Link | |
| 2005/0227761 A1 | 10/2005 | Yoshino et al. | |
| 2005/0245313 A1 | 11/2005 | Yoshino et al. | |
| 2006/0094512 A1 | 5/2006 | Yoshino et al. | |
| 2006/0100021 A1 | 5/2006 | Yoshino et al. | |
| 2006/0111190 A1 | 5/2006 | Yoshino et al. | |
| 2007/0197291 A1 | 8/2007 | Shimizu et al. | |

FOREIGN PATENT DOCUMENTS

| | | |
|---|---|---|
| JP | 58-116377 | 7/1983 |
| JP | 63-242293 | 10/1988 |
| JP | 4-49989 | 2/1992 |
| JP | 4-140791 | 5/1992 |
| JP | 4-140792 | 5/1992 |
| JP | 5-204820 | 8/1993 |
| JP | 6-42263 | 6/1994 |
| JP | 7-204349 | 8/1995 |
| JP | 08-180149 | 7/1996 |
| JP | 10-137447 | 5/1998 |
| JP | 10-222621 | 8/1998 |
| JP | 10-328408 | 12/1998 |
| JP | 11-207034 | 8/1999 |
| JP | 11-333144 | 12/1999 |
| JP | 2001-067054 | 3/2001 |
| JP | 2001-327757 | 11/2001 |
| JP | 2003-103051 | 4/2003 |
| JP | D. 1182081 | 6/2003 |
| WO | 00/79372 | 12/2000 |

OTHER PUBLICATIONS

NEC Turbo Express, printed from http://www.edu.uni-klu.ac.at/.about.kseiner/express.html on Sep. 28, 2000 (2 pages), document date unknown.

Turbo Express FAQ, printed from http://www.gameconsoles.com/turboexp_faq.htm on Sep. 28, 2000 (18 pages), last revision of document: May 25, 1995.

Computer Closet Collection, Sega Game Gear, printed from wysiwyg://28/http://www.geocities.com/.about.compcloset/SegaGameGear.htm on Sep. 28, 2000 (2 pages), copyright 1997-1999, last modified Jun. 22, 1999.

The Real Game Gear FAQ, Version GG.04, Dec. 1999, printed from http://www.classicgaming.com/museum/realggfag.txt on Sep. 28, 2000 (32 pages).

Computer Closet Collection, Atari Lynx, printed from wysiwyg://12/http://www.geocities.com/.about.compcloset/AtariLynx.htm on Sep. 28, 2000 (2 pages), copyright 1997-1999, last modified Jun. 22, 1999.

[FAQ] Atari Lynx Frequently-Asked Questions, printed from http://www.landfield.com/faqs/games/video-games/atari/lynx on Sep. 28, 2000 (16 pages), last revision of document: May 1, 2000.

Computer Closet Collection, Nintendo Game Boy/Game Boy Light, printed from wysiwyg://40/http://www.geocities.com/.about.compcloset/NintendoGameBoy.htm on Sep. 28, 2000 (5 pages), copyright 1997-1999, last modified Jun. 22, 1999.

Computer Closet Collection, Milton-Bradley Microvision, printed from wysiwyg://52/http://www.geocities.com/.about.compcloset/MiltonBradley-Microvision.htm on Sep. 28, 2000 (2 pages), copyright 1997-1999, last modified Jun. 22, 1999.

Microvision FAQ Version 0.08, copyright 1994, 1995, printed from http://www.gameconsoles.com/microvision_faq.htm on Sep. 28, 2000 (13 pages).

Computer Closet Collection, Sega Nomad, printed from wysiwyg://34/http://www.geocities.com/.about.compcloset/SegaNomad.htm on Sep. 28, 2000 (2 pages), copyright 1997-1999, last modified Jun. 22, 1999.

Sega Nomad Press Announcement of Aug. 22, 1995, printed from http://gamezero.com/team-0whats_new/past/nomad.html on Sep. 28, 2000 (2 pages).

Computer Closet Collection, Tiger Game.com, printed from wysiwyg://46/http://www.geocities.com/.about.compcloset/TigerGameCom.htm on Sep. 28, 2000 (1 page), copyright 1997-1999, last modified Jun. 22, 1999.

Tiger Game.Com, "Low Cost, Big Games", printed from http://gamecenter.com/Consoles/Features/Pocket/ss02.html on Sep. 28, 2000 (2 pages), document date unknown.

British Toys & Hobbies, "Milton Bradley—a very individual range," vol. 29, No. 1, Jan. 1980, (3 pages).

Playthings, American Toy Fair Special Highlights Edition, "Tomy augments toys with none additions for kids aged three and up," (3 pages), no date.

Playthings, Directory Issue, Market Reference Information for Buyers & Manufacturers of Toys, Hobbies & Crafts (2 pages), May 31, 1980.

'83 New Brandai Fair, "Animest," (2 pages).

Playthings, 1983 American Toy Fair Special Highlights Edition, "Thumb Power puts imprint on its new handheld games," (3 pages), Feb. 1983.

Playthings, Unveiling the 1983 Toy Lines Electronic Circuit: Expanded Section, "Nintendo Goes Beyond Hand-Held Electronic Games," (3 pages), no date.

Playthings, Special Highlights Edition, Extra: Licensing Scope; Visitor's Guide to New York, vol. 82, No. 2, Feb. 1984 (4 pages).

TH&C (Toys Hobbies & Crafts), Special Toy Fair Issue, "Electronic Toys in '79: Buyers Brace for More Shortages," (3 pages), no date.

Microvision—encyclopedia article about Microvision printed from http://encyclopedia.thefreeddictionary.com/Microvision, May 31, 2004.

Computer Closet Collection, Milton Bradley Microsivion, printed from http://www.computercloset.org/MiltonBradleyMicrovision.htm, (2 pages), May 31, 2004.

Digital Equipment Corporation printed from http://db.gamefaqs.com/portable/microvision/file/microvision.txt (11 pages), May 31, 2004.

Milton Bradley Microvision (U.S.) (1979, LCD, 9 Volt (1 or 2), Model# 4952) printed from http://users2.evl.net/~rik1138/MB/uVUS.htm.

68HC705V8 Specification Rev. 2.1 (General Release), MCU System Design Group, Oak Hill, Texas, Aug. 12, 1994, pp. iii-xi, xiii, and 89-96.

HC08—68HC08AS32, Advance Information Rev. 3.0, Motorola, printed out Jul. 24, 2001, pp. 2-27, 234-242 and 275-308.

Website http://www.repairfaq.org/REPAIR/F_Pinouts.html entitled "Pinouts for various connectors in Real Life(tm)", p. 1 of 3, dated May 20, 1997, author not established.

Christy J., Website http://www.repairfaq.org/REPAIR/F_SNES.html entitled "Super Nintendo Entertainment System: pinouts & protocol", Mar. 26, 1996, 5 pages.

Website http://vba.ngemu.com/faq.shtml entitled VirtualBoy Advance, Frequently Asked Questions, printed Mar. 31, 2004, pp. 1-17.

Website http://vba.ngemu.com entitled "Latest News: Sunday, Feb. 8, 2004—VisualBoyAdvance version 1.71.released", printed Mar. 31, 2004, pp. 1-3.

SourceForge.net:Project Filelist, Project: VisualBoyAdvance: File List, printed Apr. 21, 2004, pp. 1 and 2.

Website http://vba.ngemu.com/links/shtml entitled "Links", printed Mar. 31, 2004, pp. 1 and 2.

Website http://vba.ngemu.com/downloads/shtml entitled "Downloads", printed Mar. 31, 2004, pp. 1-11.

Website http://vba.ngemu.com/screenshots.shtml entitled "Screenshots", printed Mar. 31, 2004, pp. 1-5.

Website http://www.mame.net/hotrod.html entitled "HotRod Joystick and legal roms", printed Apr. 21, 2004, pp. 1 and 2.

Website http://www.mame.net/kibo.html entitled "Kibo explains MAME", printed Apr. 21, 2004, pp. 1-11.

Website http://www.mame.net/edge.html entitled "MAME article, Feb. 1997", printed Apr. 21, 2004, pp. 1 and 2.

Website http://www.mame.net/features.html entitled "Features", printed Apr. 21, 2004, pp. 1 and 2.

Website http://www.mame.net/compilewin.html entitled "How to compile (Win32)", printed Apr. 21, 2004, pp. 1-3.

Website http://www.mame.net/readmedos.html entitled "msdos.txt", printed Apr. 21, 2004, pp. 1-6.

Website http://www.mame.net/readmewin.html entitled "windows.txt", printed Apr. 21, 2004, pp. 1-16.

Website http://www.mame.net/readme.html entitled "mame.txt", printed Apr. 21, 2004, pp. 1-4.

Multiple Arcade Machine Emulator, Frequently Asked Questions v0.77wip, printed Apr. 13, 2004, pp. 1-41.

Website http://www.mame.net/documents.html entitled "Documents", printed Apr. 21, 2004, 1 page.

Website http://www.mame.net entitled "Welcome to the MAME website", printed Apr. 13, 2004, pp. 1-2.

Website http://www.zophar.net/gba.html entitled "GameBoy Advance Emulators", printed Mar. 30, 2004, pp. 1-4.

Website http://www.zophar.net/gb.html entitled "GameBoy Emulators", printed Mar. 30, 2004, pp. 1-12.

"Copyright.txt, VisualBoyAdvance (c) Copyright 2001 by Forgotten (vb@muhq.com)", 1 page.

"Readme vba v0.4.txt, Welcome to VisualBoyAdvance version 0.4", pp. 1-3.

Website http://www.gambitstudios.com/whatsnew.asp entitled "News, Announcements and Reviews", printed Jul. 8, 2004, pp. 1-5.

Website http://www.gambitstudios.com/Liberty.asp entitled "Liberty Game Boy Emulator", printed Jul. 8, 2004, pp. 1-4.

Website http://phoinix.sourceforge.net/ entitled Phoinix, the free Gameboy emulator for PalmOS, pp. 1-5.

Website http://palmboy.suburbia.com.au/news.htm entitled "News about PalmBoy", printed Jul. 8, 2004, pp. 1-7.

Website http://palmboy.suburbia.com.au/ entitled "PalmBoy v.3.3b", printed Jul. 8, 2004, pp. 1-11.

"readme.txt, Snes9x: The Portable Super Nintendo Entertainment System Emulator", v1.19 Jun. 5, 1999, pp. 1-13.

Website http://little-bat.de/prog/download/z80_68k/z80_68k.html entitled "z80-68k-v150, Z80 Engine written in 68020 assembler for inclusion in C/C++ projects", copyright 1994-1999, Jan. 18, 2006, pp. 1-7.

Website http://www.eff.org/patent/wanted/prior.php?p=nintendo entitled "Patent Busting Project", printed Jul. 26, 2006, 3 pages.

Website http://gb98.pocketheaven.com/ entitled "GameBoy 98 Homepage", printed Jan. 23, 2008, pp. 1-4.

Website http://users.erols.com/tiltonj/tech/nescont.html entitled "Nintendo NES and SNES controllers", printed Nov. 1, 2004, pp. 1-3.

Website http://repairfaq.ece.drexel.edu/REPAIR/F_Pinouts3.html entitled "Pinouts for various connectors in Real Life(tm)", printed Oct. 25, 2004, pp. 1-10.

Website http://repairfaq.ece.drexel.edu/REPAIR/F_Pinouts2.html entitled "Pinouts for various connectors in Real Life(tm)", printed Oct. 25, 2004, pp. 1-13.

Website http://repairfaq.ece.drexel.edu/REPAIR/F_Pinouts1.html entitled "Pinouts for various connectors in Real Life(tm)", printed Oct. 25, 2004, pp. 1-15.

Website http://www.gamesx.com/controldata/psxcont/psxcont.htm McCubbin, Andrew J., "Sony Playstation Controller Information", Aug. 13, 1998, 9 pages.

Appeal brief, examiner's answer and reply brief in co-pending U.S. Appl. No. 10/690,818.

* cited by examiner

Fig. 22
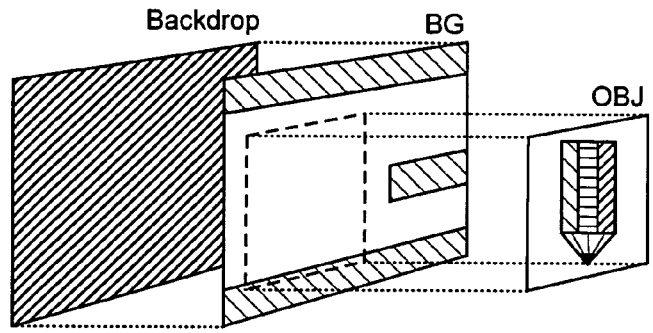
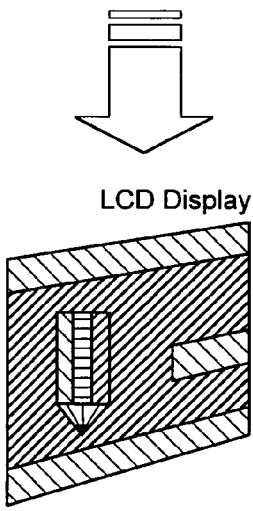
Fig. 23
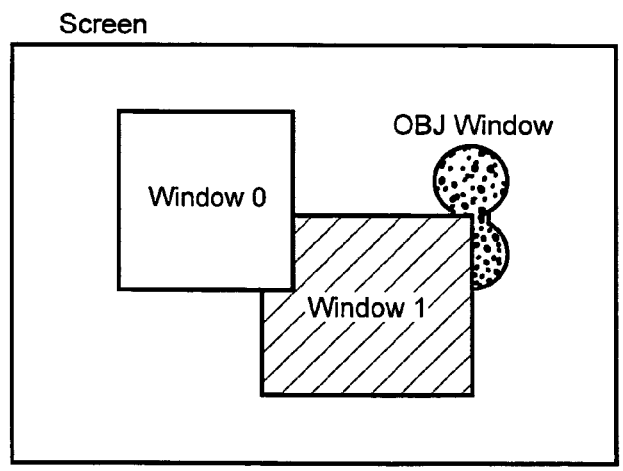

Capture Data Format

| 15 | 14 | 10 | 9 | 8 | 7 | 5 | 4 | 0 |
|---|---|---|---|---|---|---|---|---|
| A | BLUE | | | | GREEN | | RED | |
| α | Pixel Color Data | | | | | | | |

[d08–d00] : V-Counter Values

Fig. 29

| | Dot 0 | 1 | 2 | 3 | | 253 | 254 | 256 |
|---|---|---|---|---|---|---|---|---|
| Line 0 | 0h | 2h | 4h | 6h | | | | |
| 1 | 200h | 202h | 204h | 206h | | 1FAh | 1FCh | 1FEh |
| 2 | 400h | 402h | | | | 3FAh | 3FCh | 3FEh |
| 3 | 600h | 602h | | | | | 5FCh | 5FEh |
| 4 | 800h | | | | | | 7FCh | 7FEh |
| | | | | | | | | 9FEh |
| ... | | | | | | | | |
| 187 | 17600h | | | | | | | 177FEh |
| 188 | 17800h | 17802h | | | | | 179FCh | 179FEh |
| 189 | 17A00h | 17A02h | | | | | 17BFCh | 17BFEh |
| 190 | 17C00h | 17C02h | 17C04h | 17C06h | | 17DFAh | 17DFCh | 17DFEh |
| 191 | 17E00h | 17E02h | 17E04h | 17E06h | | 17FFAh | 17FFCh | 17FFEh |

| 17 | GND |
| --- | --- |
| 16 | IO7 |
| 15 | IO6 |
| 14 | IO5 |
| 13 | IO4 |
| 12 | IO3 |
| 11 | IO2 |
| 10 | IO1 |
| 9 | IO0 |
| 8 | VDD |
| 7 | INT |
| 6 | \CS2 |
| 5 | \RES |
| 4 | \CS1 |
| 3 | VHH |
| 2 | CLK |
| 1 | GND |

Fig. 31

GAME CONSOLE AND EMULATOR FOR THE GAME CONSOLE

CROSS-REFERENCE TO RELATED APPLICATIONS

This application is a continuation-in-part of application Ser. No. 11/111,985, filed Apr. 22, 2005, which is a continuation-in-part of application Ser. No. 10/921,957, filed on Aug. 20, 2004. The contents of each of these applications are incorporated herein in their entirety.

COPYRIGHTS PRESERVED

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The illustrative embodiments relate to an electronic game and communications device and, more specifically, to a console configuration for a portable, handheld electronic game with dual screens. Certain of the illustrative embodiments also relate to a portable game machine including two or more display units, on each of which a three-dimensional game image, generated by a three-dimensional image processing unit, is displayed.

BACKGROUND

Portable, handheld game devices are by now well known in the art. See, for example, U.S. Pat. Nos. 6,716,103; 6,743,104; 6,821,204. Game devices previously have not had, for example, dual screen functionality in combination with touch-sensitive technology.

BRIEF DESCRIPTION OF EXAMPLE EMBODIMENTS

In an example embodiment, a portable, handheld electronic game device is provided in a unique console configuration, outfitted and arranged for easy access to various functional features and related aspects of the game device.

Generally, the portable game device in the example embodiment is made up of a main body and a cover body that is pivotally attached to the main body for movement between open and closed positions. Twin, backlit, color liquid crystal displays (LCD's) are provided, one on each of the inner surfaces of both the main body and cover body such that, when the cover body is pivoted over the main body to the closed position, the display screens substantially overlie one another and are hidden from view (and thus protected). Each LCD is a three inch screen that can reproduce true 3-D views, and at least one of the screens also employs touch-sensitive technology for enhanced interaction with associated games. To further enhance the interactive experience, a stylus is provided with the game for activating the touch screen, and a blind bore is provided in the main body for storing the stylus when it is not being used.

The main body of the device is also provided with all of the game control buttons. Most of the control buttons are on the inner face of the main body, on either side of the display screen, along with microphone, recharge, and power indicators. The rearward portion of a peripheral edge surrounding the main body also supports an additional pair of buttons for game control. The peripheral edge of the main body also provides access to various other features and functions of the device. For example, a forward portion of the peripheral edge incorporates a volume control slide, a first game card slot as well as headphone/microphone connectors. The rearward portion of the peripheral edge is provided with, in addition to the control buttons, an external extension connector for connecting an AC adaptor that can be used to either recharge the internal battery or to operate the game device using household power; a wrist strap attachment mechanism; the stylus port; and a second game slot. This second game card slot may, for example, accommodate game cards from other game systems such as other game systems manufactured by the assignee of this application.

In addition to the LCD on the inner face of the cover body, the latter is also provided with a pair of stereo speakers, one on either side of the display screen.

In accordance with a feature of an example embodiment, the portable game machine includes hardware/software capable of simultaneously displaying different three-dimensional images on two display units by using a single three-dimensional image processing unit without causing flicker on the display screens.

Also, another feature of an example embodiment is to make it possible for a portable game machine to include two display units, at least one two-dimensional image processing unit, and a single three-dimensional image processing unit, wherein a game image generated by the two-dimensional image processing unit is displayed on one of the display units and a game image generated by the three-dimensional image processing unit is displayed on the other display unit, and to simultaneously display different three-dimensional game images on the two display units without adding another three-dimensional image processing unit or substantially changing the configuration of the portable game machine.

Example handheld portable game devices and emulators of these handheld portable game devices will now be described in detail in connection with the drawings identified below.

BRIEF DESCRIPTION OF THE DRAWINGS

FIG. 15 is an illustration showing one example of a game screen displayed on a first display screen 11a and a second display screen 212a;

FIG. 22 shows a relationship between a backdrop, a background (BG) and an object (OBJ);

FIG. 23 shows the precedence of windows for the example portable game system;

FIG. 29 shows the LCD pixel map of capture data when the capture size is 256×192 dots;

FIG. 31 shows an example arrangement of terminal strips for the game card of FIG. 30;

DETAILED DESCRIPTION OF EXAMPLE EMBODIMENTS

Figure 1:
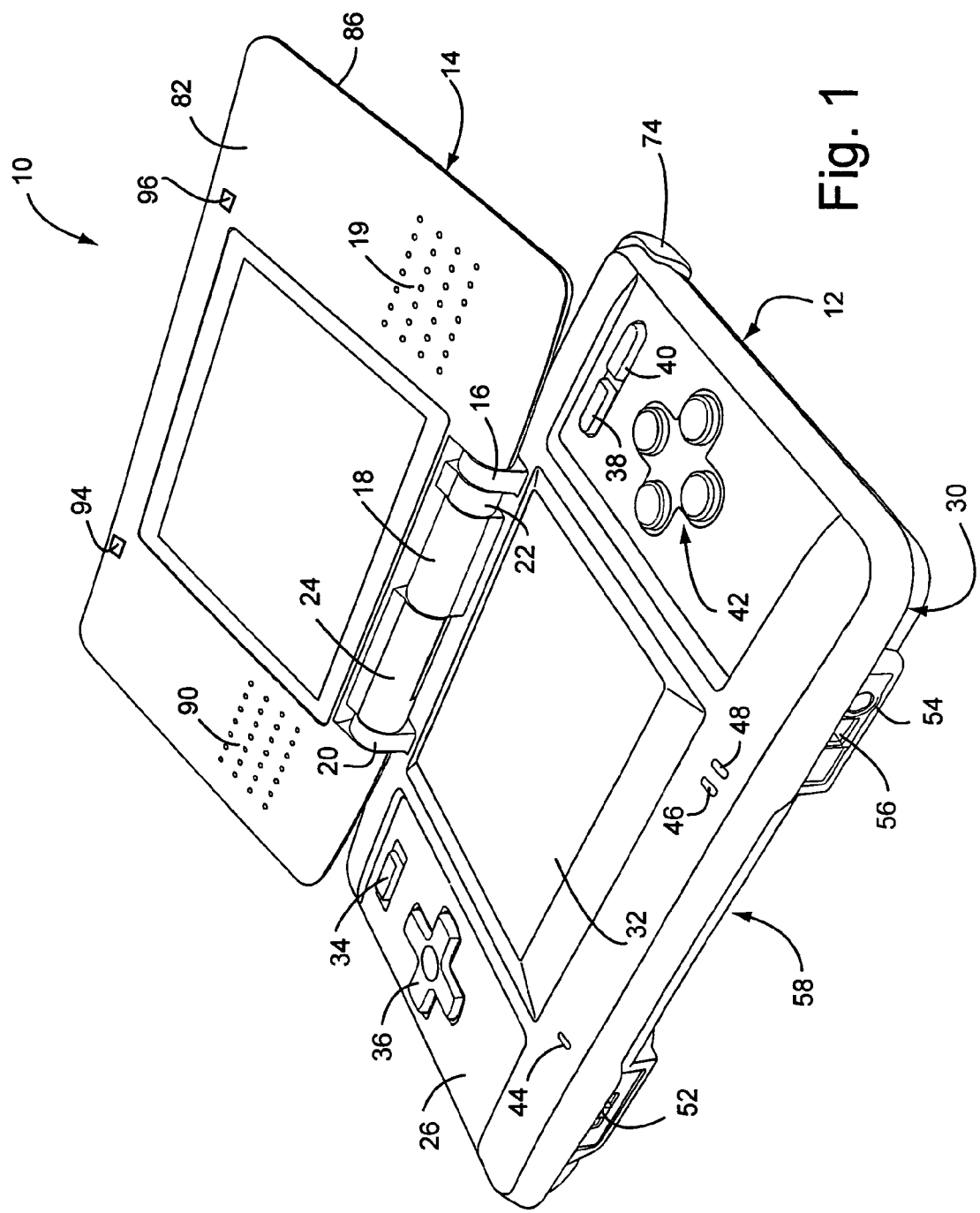
FIG. 1 is a perspective view of the electronic game and communications device in accordance with an example embodiment, with the device shown in an open, ready-to-use orientation.
Figure 2:
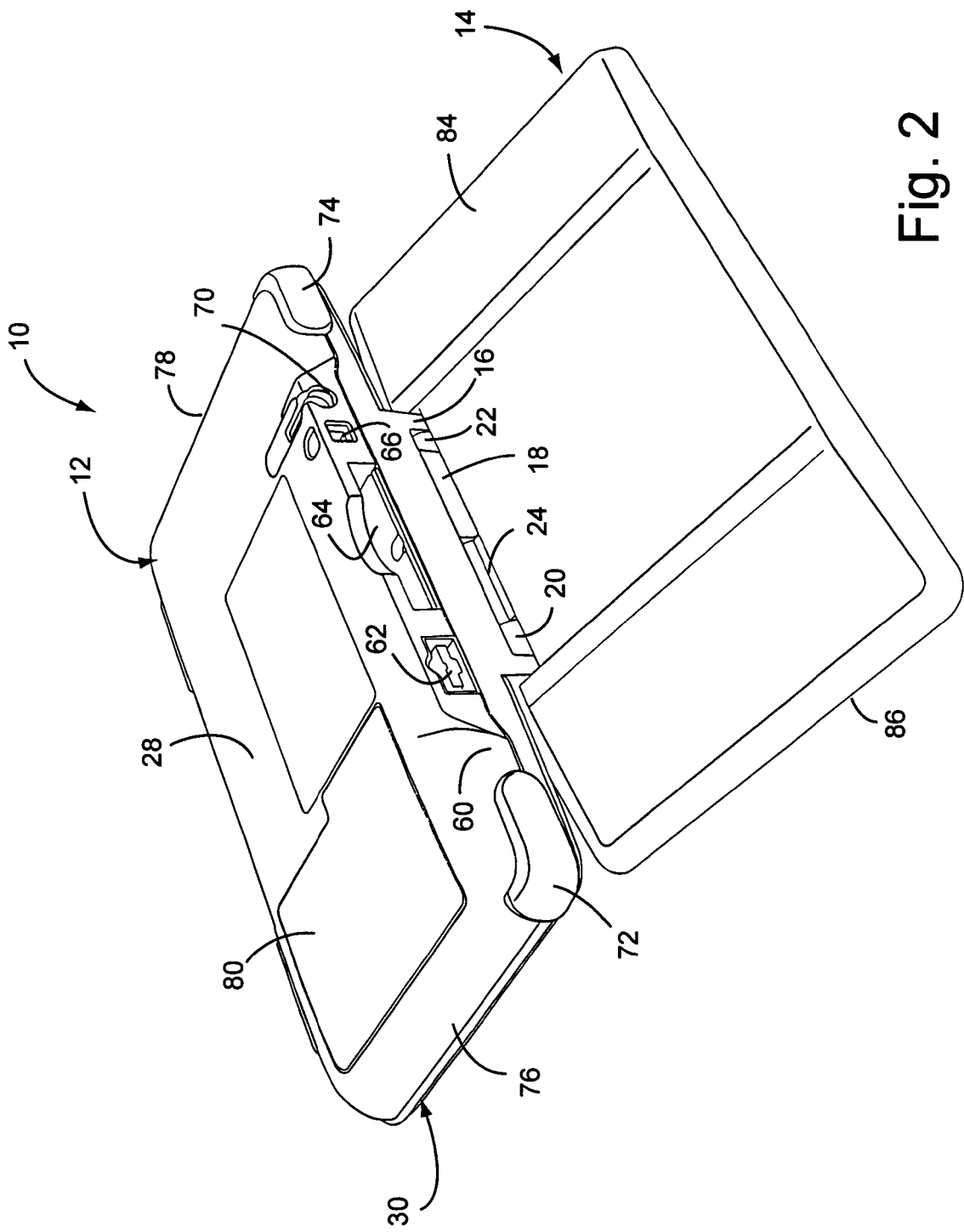
FIG. 2 is a inverted perspective view of the game device shown in FIG. 1.

Referring to FIGS. 1 and 2, in an illustrative example embodiment the game system or console 10 includes a main body 12 and a cover body 14 hingedly connected to each other along an upper edge of the main body 12 and a lower edge of the cover body 14 (references herein to terms such as "upper" and "lower" and "forward" and "rearward" are for ease of understanding and are made relative to an orientation of the game device where the cover body 14 is in an open position and the game is being held by a user in a normal operating position). Hinge elements 16, 18 and 20 on the main body 12 mesh with hinge elements 22 and 24 on the cover body, with a hinge pin (not shown) extending through the aligned hinge elements in conventional fashion. Note that because hinge elements 16, 18 and 20 extend from the upper (or inner) face 26 of the main body 12, the cover body 14 overlies the upper face 26 when the cover body 14 is closed over the main body.

When the cover body 14 is in its fully open position, it is substantially parallel to the main body 12 but lies in a substantially parallel, offset plane. The main body 12 also has a lower (or outer) face 28 (FIG. 2) and a peripheral edge 30.

A first display screen 32 is recessed within the upper face 26 of the main body 12 with dimensions of approximately 2½ inches in length and 1⅞ inches in width, yielding a diagonal screen dimension of 3 inches. The screen in the example embodiment is a backlit (e.g., 40 candelas), color liquid crystal display (LCD) with a display resolution of 256×192 dots (aspect ratio 4:3). This screen is touch sensitive and may be activated by a stylus, described further herein. A power button 34 is located in the upper left corner of face 26 and is used to turn the game console on and off. A cross-shaped directional control button 36 is located adjacent and below the power button 34, and is used for game play control.

Figure 27A:
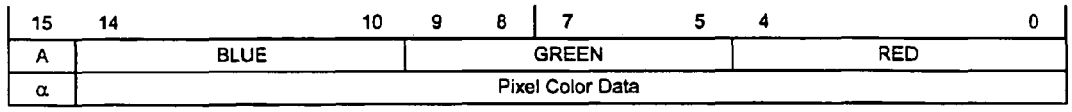
FIGS. 27(a) and 27(b) show an example of a touch panel display structure usable for the example portable game system.
Figure 27B:
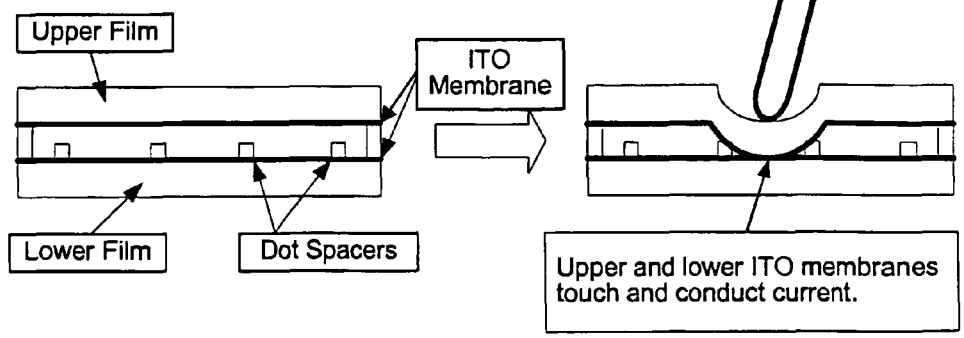

More specifically, display screen 32 includes a resistive-membrane touch panel that allows coordinates to be obtained in dot units. The touch panel can be operated with a finger or a stylus. The touch panel input data includes x-coordinate (e.g., 8 bits); y-coordinate (e.g., 8 bits); touch determination flag (e.g., 1 bit); and data validity flag (e.g., 2 bits). In the example portable game system, the touch panel must be pressed down with a force that exceeds a specified value, e.g., 80 g, for the location to be detected. The details of the input data for the touch panel are shown below:

x-coordinate, y-coordinate
x-coordinate: 0-255 (dots)
y-coordinate: 0-191 (dots)
touch determination flag
0: the touch panel is not being touched
1: the touch panel is being touched
data validity flag
00: both the x-coordinate and y-coordinate are valid
01: the x-coordinate is invalid
10: the y-coordinate is invalid
11: both the x-coordinate and y-coordinate are invalid FIGS. 27(a) and 27(b) show an example touch panel structure which includes an upper film 902, a lower film 904, transparent conducting membranes 906, 908 and dot spacers 910. As shown in FIG. 27(a), normally, the space formed between the upper and lower films 902, 904, each of which is respectively coated with a transparent conducting membrane 906, 908 (such as an indium-tin-oxide (ITO) membrane), prevents current from being conducted. When a finger or stylus presses on the panel as shown in FIG. 27(b), the pressure causes the upper and lower films to touch and conduct current. The dot spacers 910 prevent erroneous input and the example portable game system from being continuously on.

In the example portable game system, the touch panel structure extends over all or substantially all of the display screen. It is of course possible, if desired, to provide the touch input only over a portion of the display screen.

In the upper right corner of the main body 12, there are side-by-side "start" and "select" buttons 38, 40, respectively, with X/Y/A/B buttons 42 located adjacent and below the "start" and select"buttons. Buttons 38, 40 and 42 are also used for game play control. A microphone 44 (which may, for example, be an omni-directional condenser microphone) is located below the left edge of screen 32 for use with specially designed games or other applications (e.g., voice chat) having a microphone feature. A battery recharge indicator LED 46 and a power indicator LED 48 are also located on the upper face 26, adjacent the lower edge thereof, below the right edge of screen 32.

Figure 3:
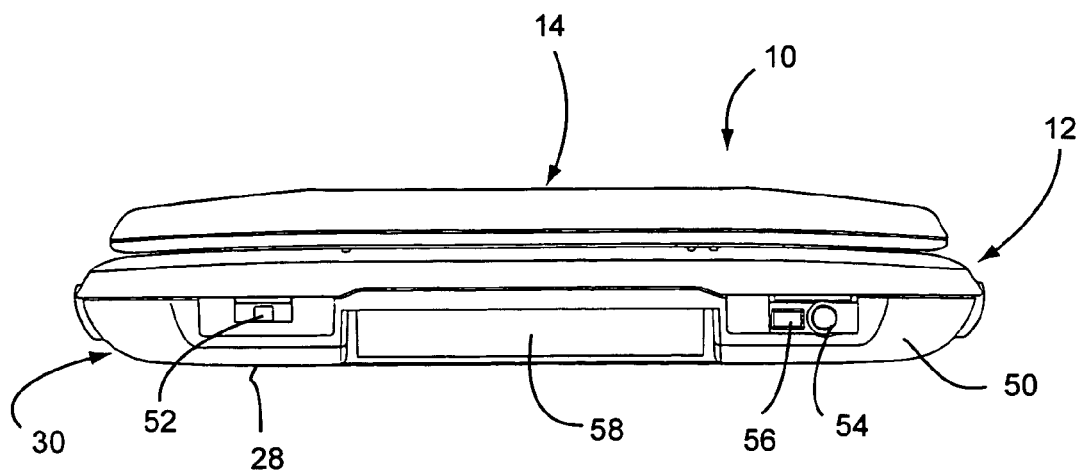
FIG. 3 is a front elevation of the device shown in FIG. 1, but with the game shown in a closed position.
Figure 4:
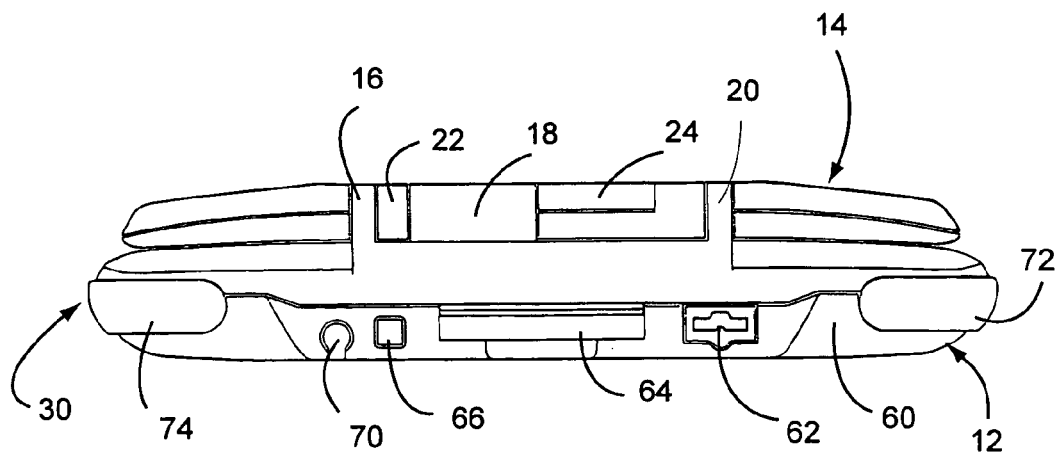
FIG. 4 is a rear elevation of the device shown in FIG. 3.

With reference now especially to FIG. 3, a lower or forward portion 50 of the peripheral edge 30 (closest to the user) is provided with a volume control slide 52 and headphone and microphone connectors 54, 56 on either side of a first game slot 58. In the example portable game system, slot 58 is especially designed for larger game cartridges or cards originally designed for use with the assignee's Game Boy Advance® game system. Of course, slot 28 may be otherwise designed and the invention is not limited in this respect.

Figure 5:
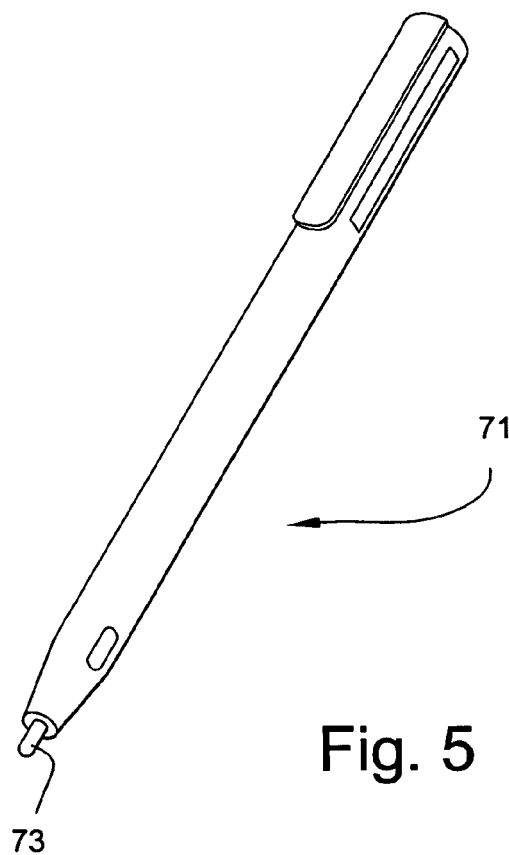
FIG. 5 is a perspective view of a stylus for use with the game device shown in FIGS. 1-4.

As best seen in FIG. 2, an upper or rearward portion 60 of the peripheral edge 30 is provided with an external extension connector 62 that permits connection to an AC adapter for recharging the internal battery (not shown), or for operating the game using household power. A second game slot 64 in edge portion 60 is designed for receiving memory or game cards especially designed for this example game system. The second game slot 64 is smaller than the first game slot 58, reflecting the different sizes of the game cards. Openings 66, 68 form an elbow-shaped through slot adapted for securing a wrist strap (not shown), thereby enabling the user to secure the game system to the body and thus minimize the potential for losing, misplacing or dropping the game system. A stylus port or holder, in the form of a blind bore 70 is located adjacent the wrist-strap mount for holding a stylus 71 (FIG. 5) before or after use.

The stylus 71 is a plastic pencil-shaped device with a rounded tip 73 and is used to activate the touch screen 32.

A pair of left, right control buttons (or shoulder buttons) 72, 74 are located on the peripheral edge 30, at the corners where the upper portion 60 of the peripheral edge 30 meets the side portions 76, 78 of the peripheral edge. The location of these buttons and the location of previously described buttons 34, 36 and 42 facilitate manipulation game control by the user's thumbs and index fingers when the game is held with two hands in a natural and intuitive manner.

The lower (or outer) face 28 of the main body is provided with a battery cover 80 (FIG. 2) for accessing a rechargeable battery pack located within the main body.

The cover body 14 also has an upper (or inner) face 82 (FIG. 1) and a lower (or outer) face 84 (FIG. 2) connected by a peripheral edge 86. The upper face 60 incorporates a second display screen 88 of substantially the same dimensions as screen 32. Screen 88 is also a backlit color LCD. The cover body 14 also incorporates a pair of stereo speakers, with speaker grills 90, 92 located on opposite sides of the screen 88. Dimples or pads 94, 96 may be located above and laterally of screen 88. The dimples may be made of a compressible polymer or other suitable material and serve to dampen engagement of the inner surface 82 of the cover body 14 with the inner surface 26 of the main body 12 when the cover body is closed over the main body. In this example portable game system, screen 88 is not provided with a touch panel structure. Of course, the invention is not limited in this respect and screen 88 may, if desired, be provided with a touch panel structure that extends over all, substantially all, or a part of the display screen.

As already noted, the game card slot 58 is sized and adapted to receive a conventional game card designed for the by now well known Nintendo Gameboy Advance System®. Accordingly, the game card per se for slot 58 does not form any part of this invention and need not be described further.

Figure 6:
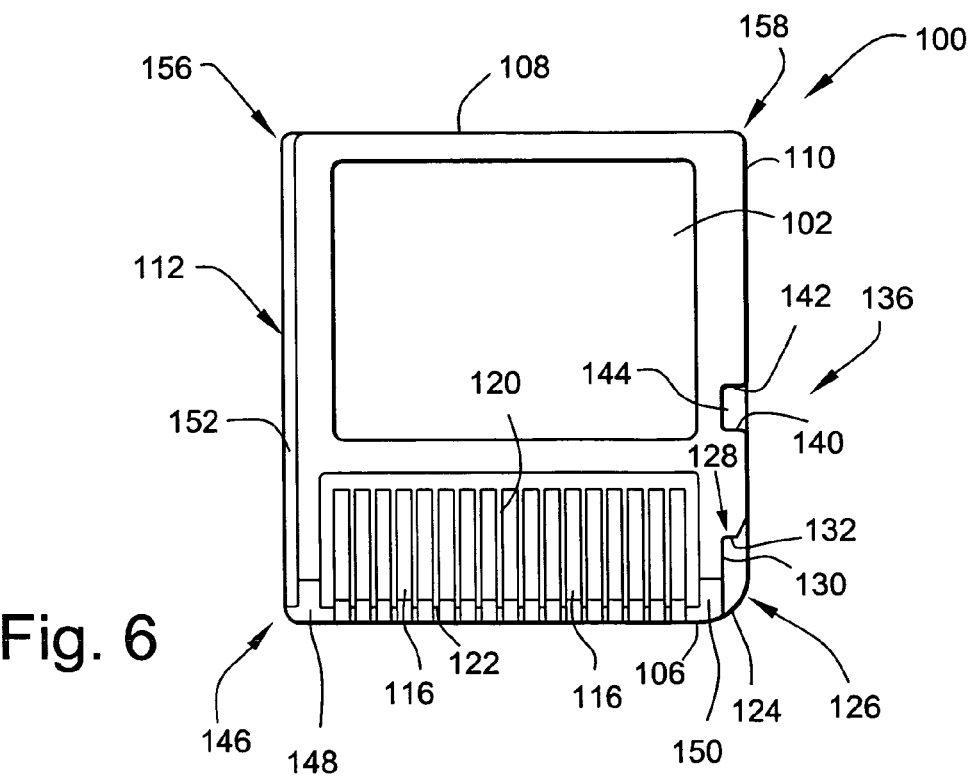
FIG. 6 is a plan view of a game card for use with the game device shown in FIGS. 1-4.
Figure 7:
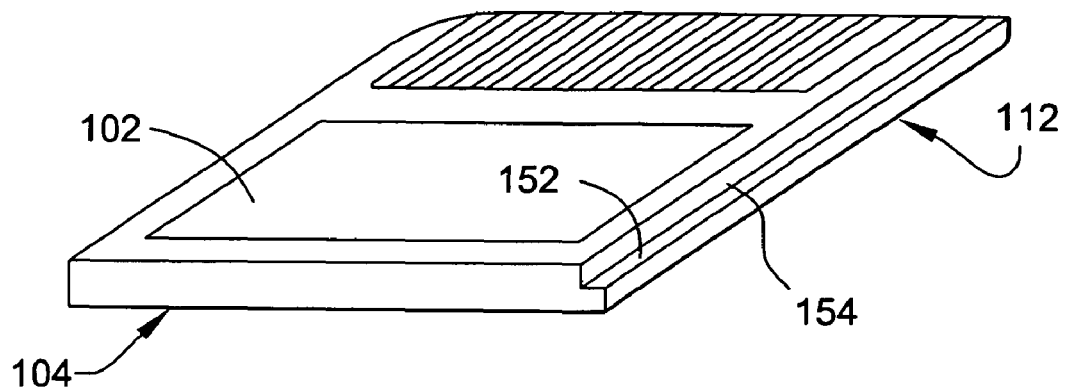
FIG. 7 is a rear perspective view of the game card shown in FIG. 6.
Figure 8:
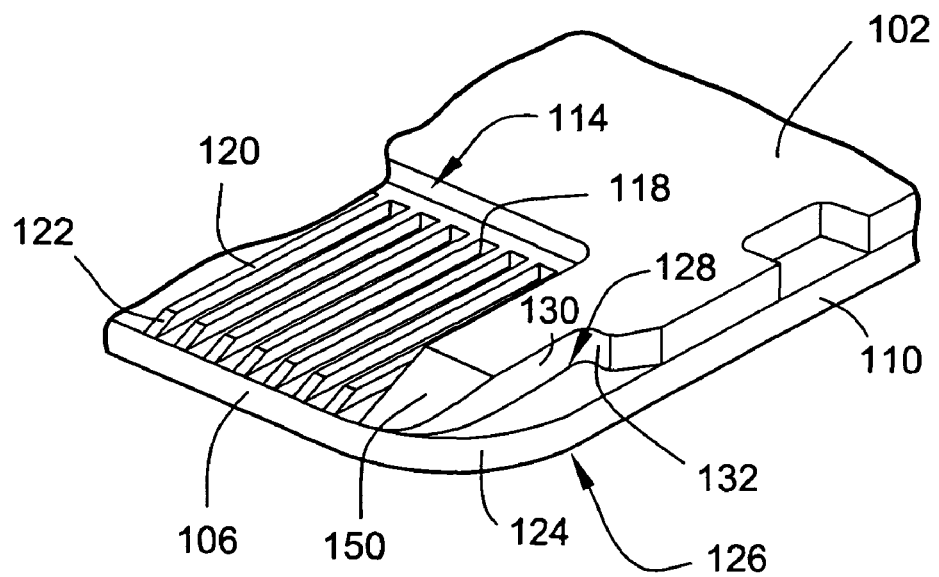
FIG. 8 is an enlarged perspective view of a front, right corner of the card shown in FIG. 6.

The new game or memory card 100 designed especially for use with this game device is shown in FIGS. 6, 7 and 8.

The game or memory card 100 is preferably of molded plastic construction and has substantially planar upper and lower surfaces 102, 104, respectively, a forward edge 106, rearward edge 108 and side edges 110, 112. The forward end of the upper surface 102 is formed with a rectangular recess 114 in which a plurality of terminal strips 116 are located, extending from a rear wall 118 of the recess to the forward edge 106 of the card. The rearward wall 115 of the recess is substantially perpendicular to the upper and lower surfaces 102, 104 but, as a practical matter, is sloped by no more than about 3 degrees simply to facilitate removal of the card from the mold during manufacture of the card. The terminal strips 116 are parallel to each other and are separated by raised ribs 120 that also extend from the rear wall 118 to the forward edge 106. The free ends 122 of the ribs 120 are chamfered as best seen in FIG. 8 to facilitate sliding entry of the card into the slot 58 in the main body 12. Ribs 120 also protect the terminal strips 116 from contact with the users' hands or other objects. The recess 114 and array of terminal strips 116 are not centered along the forward edge 106 of the card, but rather, are offset laterally toward the side edge 112 for a purpose explained in greater detail below.

An enlarged radius 124 is formed at forward corner 126 where the side edge 110 meets forward edge 106. A first notch 128 is formed in corner 126, defined by a vertical notch side wall 130, a vertical notch back wall 132 and a flat notch bottom wall 134. The latter is parallel to the upper and lower card surfaces 102, 104, while notch side wall 130 is parallel to side edges 110, 112, and notch back wall is perpendicular to the notch side wall 130 and parallel to the card forward edge 106. The depth of the notch is about half the approximate ⅛ inch thickness of the card, and the length of the notch is about ¼ inch, which in turn, is about half the length of the recess 114. Rearwardly of the notch 128, along the card side edge 110, there is formed a second notch 136 that opens to the side of the card, defined by parallel side walls 140, 142 and a back wall 144. Side walls 140, 142 are parallel to forward and rearward card edges 106, 108 while back wall 144 is parallel to card side edges 110, 112. An angled surface 145 connects back wall 144 to the edge 110. Here again, the depth of the notch is about half the thickness of the card, and the length of the notch is about ⅛ inch.

Notches 128 and 136 cooperate with components of a "push-push" mechanism inside the game slot 64 to provide controlled, spring-loaded movement of the game card during insertion and ejection.

The opposite forward corner 146 of the card where side edge 112 meets forward edge 106 is defined by a smaller radius than radius 124. Note that the forward surfaces 148, 150 of the card on either side of the recess 114 are also chamfered to substantially the same degree as the chamfer on ribs 120.

Side edge 112 is stepped along its entire length in the upper plane of the card only, as defined by horizontal shoulder 152 that is parallel to upper and lower surfaces 102, 104 and a recessed edge portion shoulder 154 that is parallel to the side edges 110, 112. This shoulder insures correct orientation of the card when inserted into a game system slot.

The rearward edge 108 of the card is substantially uniform in profile from side edge 110 to side edge 112, with both rearward corners 156, 158 rounded by a radii similar to the radius at corner 146.

The dimensions of the card are matched to the game system entry slot, and in the exemplary embodiment, the card 100 is substantially square, with a length dimension (front-to-back) of 1⅜", and a width dimension (side-to-side) of 1¼".

When inserted into the game system entry slot, card 100 is electrically connected via the terminal strips 116 to the processing circuitry of the example portable game system. In this way, the processing circuitry can access the electrical components on the card. For example, if the card includes a memory, the processing circuitry can read data from and/or write data to the memory on the card. The electrical components on the card are of course not limited a memory.

More specifically, when card 100 is inserted into the game system entry slot of the example portable game system, the terminal strips 116 electrically contact or mate with corresponding electrical contacts within example portable game system. This action electrically connects the electrical components to the electronics within the example portable game system. The electrical components of card 100 may include a ROM that stores instructions and other information pertaining to a particular video game. The ROM for one card 100 may, for example, contain instructions and other information for an adventure game while the ROM of another card 100 may contain instructions and other information for a car race game, an educational game, etc. To play a game, a user of the example portable game system need only connect an appropriate card 100 into slot 58—thereby connecting the card's ROM (and any other circuitry it may contain) to the example portable game system. This enables the electronics of the example portable game system to access information contained within the ROM, which information controls the game system to play the appropriate video game by displaying images and reproducing sound as specified under control of the ROM game program information.

Figure 30:
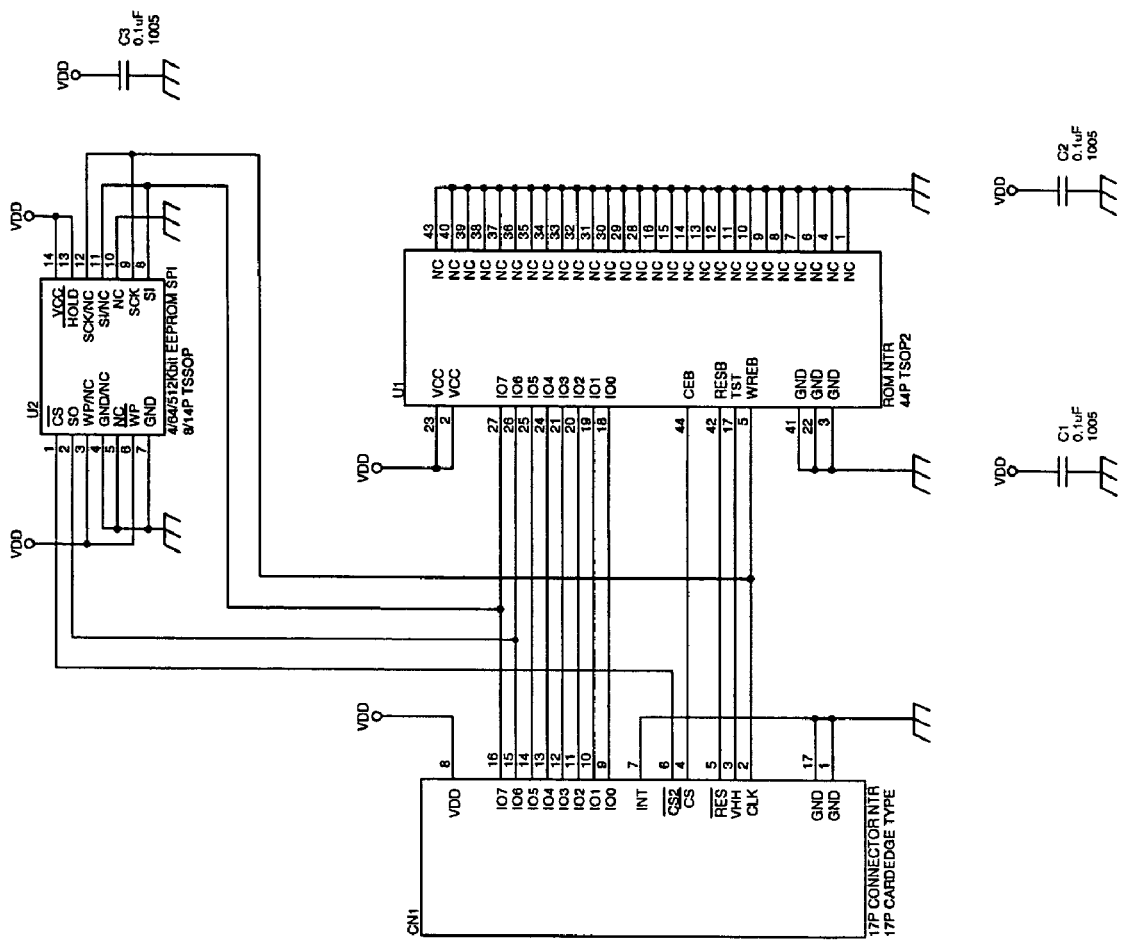
FIG. 30 is a block diagram showing example components for the game card of FIGS. 6-8.

FIG. 30 is a block diagram showing example components for the game card of FIGS. 6-8. Game card 100 shown in FIG. 30 includes a connector CN1, a ROM U1 (44P TSOP2) and an EEPROM U2 (8/14P TSSOP). Pins 2 and 23 of ROM U1 are connected to VDD and pins 3, 22 and 41 are connected to ground. ROM U1 is reset at start-up by a signal provided by the /RES (reset) terminal. When /CS is low, ROM U1 of card 100 is accessed in a parallel bus mode via terminals IO0 to IO7. When /CS2 is low, EEPROM U2 of card 100 is accessed in SPI (serial peripheral interface) mode in which terminal IO7 is a serial input terminal and terminal IO6 is a serial output terminal.

FIG. 31 shows an example arrangement of terminal strips 116 for card 100. The following table summarizes the terminal arrangement:

| 1 | GND |
|---|---|
| 2 | CLK |
| 3 | VHH |
| 4 | /CS1 |
| 5 | /RES (reset) |
| 6 | /CS2 |
| 7 | INT (interrupt) |
| 8 | VDD |
| 9 | IO0 |
| 10 | IO1 |
| 11 | IO2 |
| 12 | IO3 |
| 13 | IO4 |
| 14 | IO5 |
| 15 | IO6 |
| 16 | IO7 |
| 17 | GND |

Figure 9:
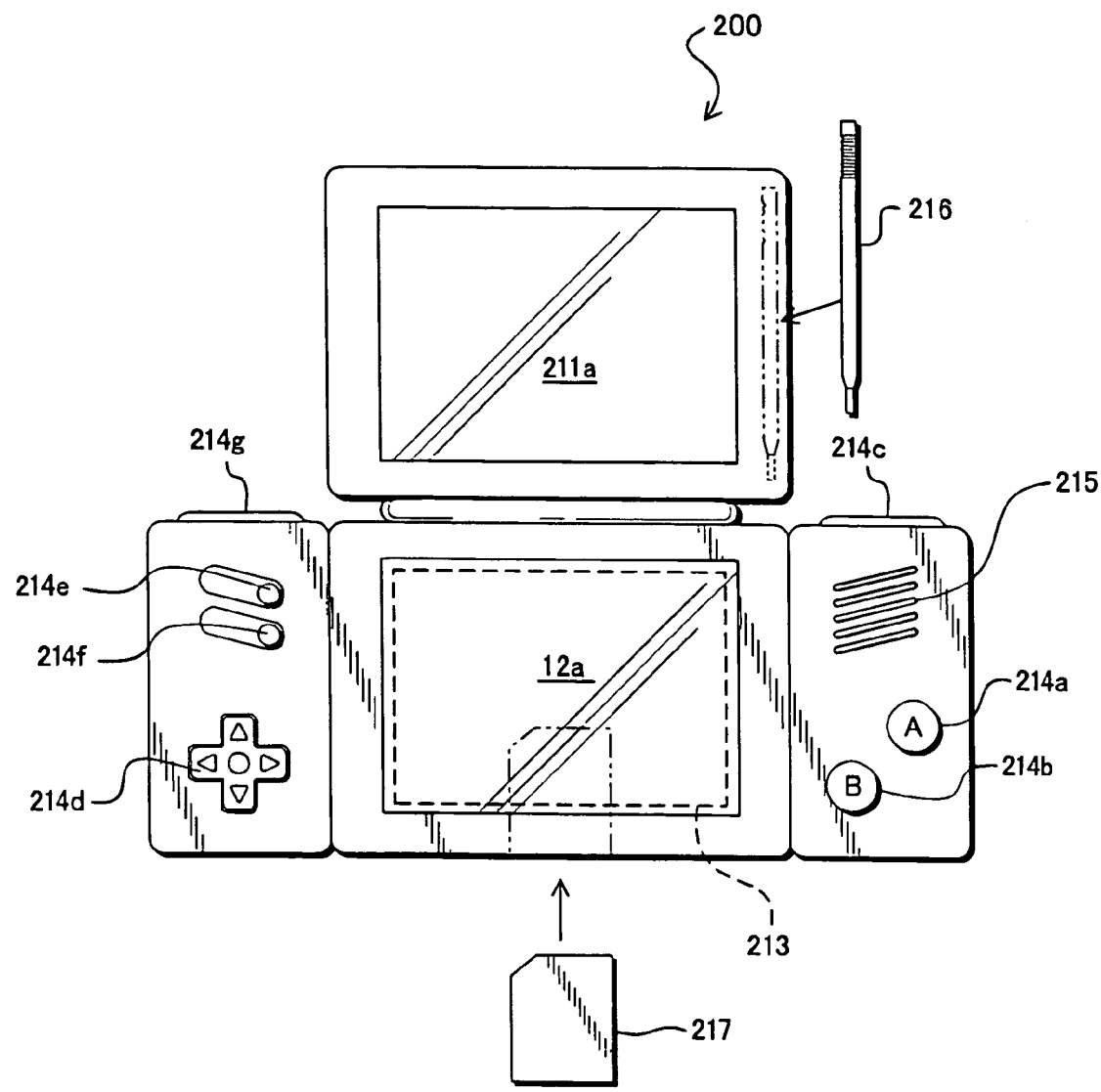
FIG. 9 is an external view of a portable game machine according to a further example embodiment.

FIG. 9 is a further illustrative embodiment of a portable game machine 200. As with the prior embodiment, a further example game machine physically including two display screens with one of the display screens being covered with a touch panel is exemplarily described. In the present embodiment, a game image is displayed on at least the display screen covered with the touch panel. Also, a non-portable video game machine, an arcade game machine, a portable terminal, a cellular phone, or a personal computer may be used as the game machine.

FIG. 9 is an external view of the portable game machine 200. As shown in FIG. 9, the portable game machine 200 includes two display screens, that is, a first display screen 211a and a second display screen 212a. The surface of the second display screen 212a is covered with a touch panel 213. Also, to the right of the second display screen 212a, the game machine includes an A button 214a, a B button 214b, and an R switch 214c, which are operable by the right hand of the player, and a loudspeaker 215 for producing game music. To the left of the second display screen 212a, the game machine includes a cross key 214d, a start button 214e, a select button 214f, and an L switch 214g, which are operable by the left hand of the player. Also, the portable game machine 200 includes a removable stylus 216 for input to the touch panel 213. Furthermore, the portable game machine 200 has, removably inserted therein, a cartridge 217, which is a storage medium having stored therein a game program of the illustrative embodiments. Note that, in the present embodiment, the touch panel 213 is exemplarily provided as an input unit, but this does not restrict the present invention.

Figure 10:
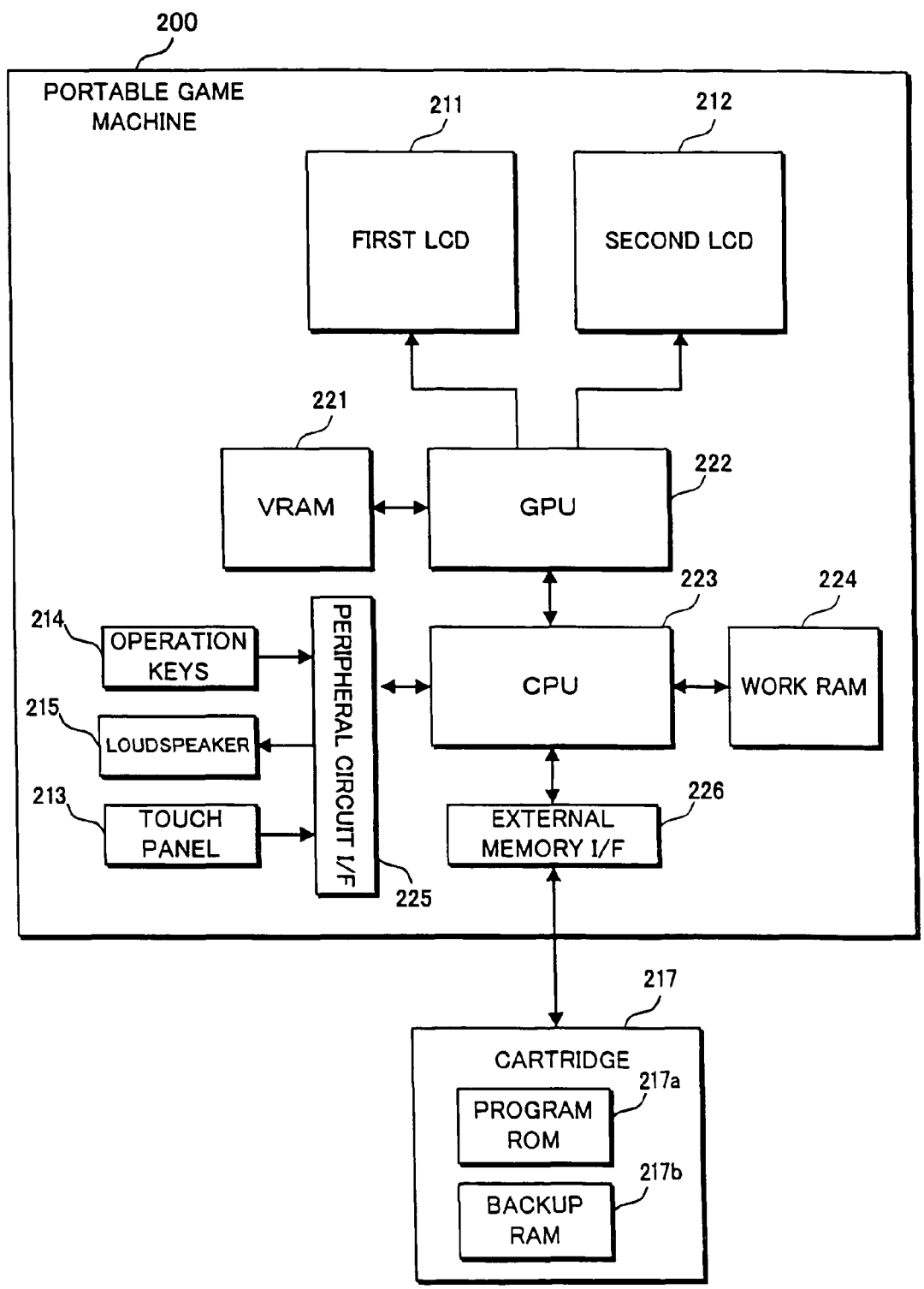
FIG. 10 is an illustration showing an internal configuration of a portable game machine.

FIG. 10 is a block diagram showing the portable game machine 200. It should be understood that the hardware/software and operational description which follows is applicable to the illustrative embodiment shown in FIGS. 1-8 as well as the illustrative embodiment shown in FIG. 9. As shown in FIG. 10, the portable game machine 200 includes a CPU (central processing unit) 223, which is an example of a computer for executing the game program, and other components. The CPU 223 includes a work RAM (working storage unit) 224, a GPU (graphic processing unit) 222, and a peripheral circuit I/F (interface) 225 that are electrically connected to one another. The work RAM 224 is a memory for temporarily storing, for example, the game program to be executed by the CPU 223 and calculation results of the CPU 223. The GPU 222 uses, in response to an instruction from the CPU 223, a VRAM 221 to generate a game image for display output to a first LCD (liquid crystal display unit) 211 and a second LCD 212, and causes the generated game image to be displayed on the first display screen 211a of the first LCD 211 and the second display screen 212a of the second LCD 212. The peripheral circuit I/F 225 is a circuit for transmitting and receiving data between external input/output units, such as the touch panel 213, the operation keys 214, and the loudspeaker 215, and the CPU 223. The touch panel 213 (including a device driver for the touch panel) outputs coordinate data corresponding to a position input (specified) with the stylus 216.

Furthermore, the CPU 223 is electrically connected to the external memory I/F 226, in which the cartridge 217 is inserted. The cartridge 217 is a storage medium for storing the game program and, specifically, includes a program ROM 217a for storing the game program and a backup RAM 217b for rewritably storing backup data. The game program stored in the program ROM 217a of the cartridge 217 is loaded to the work RAM 224 and is then executed by the CPU 223. In the present embodiment, an exemplary case is described in which the game program is supplied from an external storage medium to the portable game machine 200. However, the game program may be stored in a non-volatile memory incorporated in advance in the portable game machine 200, or may be supplied to the portable game machine 200 via a wired or wireless communication circuit.

Figure 11:
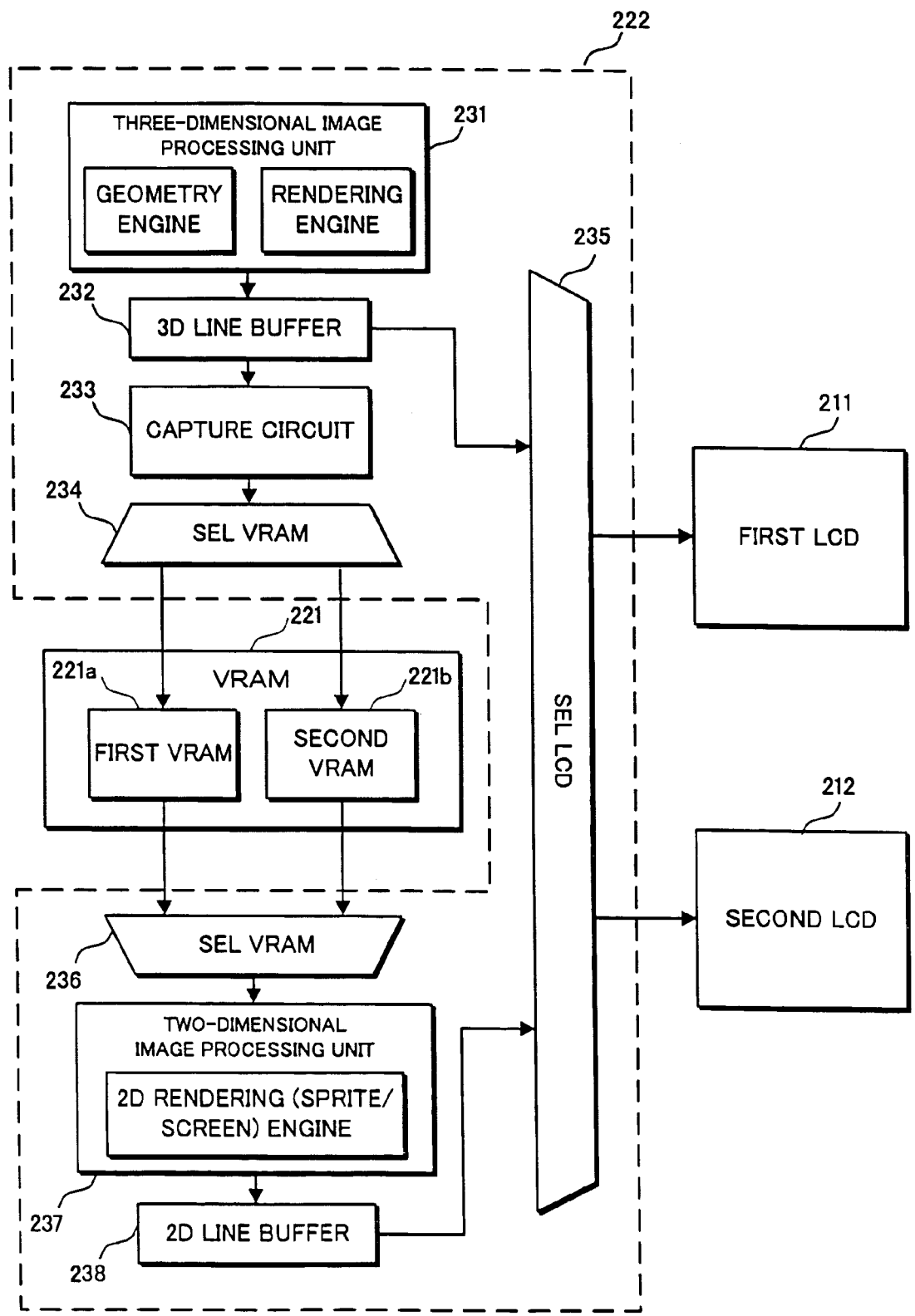
FIG. 11 is an illustration showing an internal configuration of a GPU 222.

FIG. 11 is a block diagram of the GPU 222. The GPU 222 includes two image processing units, that is, a three-dimensional image processing unit 231 and a two-dimensional image processing unit 237. The three-dimensional image processing unit 231 includes a geometry engine for calculating each vertex of a three-dimensional model based on three-dimensional model data and a rendering engine for generating a game image from the three-dimensional model disposed on a virtual three-dimensional game space. The two-dimensional image processing unit 237 includes a 2D rendering engine for generating a game image based on two-dimensional image data representing characters and two-dimensional image data representing backgrounds. More specifically, the two-dimensional image processing unit 237 disposes a two-dimensional image representing a character on a virtual screen called a "sprite" and a two-dimensional image representing a background on a virtual screen called a "screen", and then synthesizes these virtual screens to generate a game image to be eventually displayed.

The three-dimensional image processing unit 231 is connected to the 3D line buffer 232. The 3D line buffer 232 is a buffer memory for temporarily retaining image data for one scanning line of the first LCD 211 (or the second LCD 212). The image data generated by the three-dimensional image processing unit 231 is stored in this 3D line buffer 232 sequentially by one line.

The 3D line buffer 232 is connected to a capture circuit 233 and an LCD selector (SEL LCD) 235. The capture circuit 233 sequentially reads image data for one line stored in the 3D line buffer 232 and then sequentially stores the read image data in the VRAM 221, which will be described further below, thereby capturing the game image generated by the three-dimensional image processing unit 231.

The capture circuit 233 is connected to a VRAM selector (SEL VRAM) 234. The VRAM 221 is provided with two VRAMs, that is, a first VRAM 221a and a second VRAM 221b. Instead of these two first and second VRAMs 221a and 221b, a single VRAM may be used with its two different storage areas being used as the first VRAM 221a and the second VRAM 221b. The VRAM selector 234 switches an output destination of the capture circuit 233 between the first VRAM 221a and the second VRAM 221b.

The first VRAM 221a and the second VRAM 221b are connected to a VRAM selector (SEL VRAM) 236. The VRAM selector 236 switches a source of data to the two-dimensional image processing unit 237 between the first VRAM 21a and the second VRAM 221b.

The two-dimensional image processing unit 237 is connected to a 2D line buffer 238. As with the 3D line buffer 232, the 2D line buffer 238 is a buffer memory for temporarily retaining image data for one scanning line of the second LCD 212. The image data generated by the two-dimensional image processing unit 237 is stored in this 2D line buffer 238 sequentially by one line.

The 2D line buffer 238 is connected to an LCD selector 235. The LCD selector 235 switches an output destination of the 3D line buffer 232 between the first LCD 211 and the second LCD 212, and an output destination of the 2D line buffer 238 between the first LCD 211 and the second LCD 212. In the present embodiment, the LCD selector 235 performs control such that, when the output of the 3D line buffer 232 is supplied to the first LCD 11, the output of the 2D line buffer 38 is supplied to the second LCD 212, and when the output of the 3D line buffer 232 is supplied to the second LCD 212, the output of the 2D line buffer 238 is supplied to the first LCD 211.

The portable game machine 200 has the above-described structure. Generally, the game image generated by the three-dimensional image processing unit 231 is supplied via the 3D line buffer 232 and the LCD selector 235 to the first LCD 211, while the game image generated by the two-dimensional image processing unit 237 is supplied via the 2D line buffer 238 and the LCD selector 235 to the second LCD 212. As a result, the three-dimensional game image generated by the three-dimensional image processing unit 231 is displayed on the first display screen 211a, while the two-dimensional game image generated by the two-dimensional image processing unit 237 is displayed on the second display screen 212a. However, the present embodiment has a feature in which the above-structured portable game machine 200 is used to display different three-dimensional game images on two display screens, that is, the first display screen 211a and the second display screen 212a. Hereinafter, the operation of the portable game machine 200 according to the present embodiment is described.

The portable game machine 200 alternately performs operations with periods of one frame. Hereinafter, the operation of the portable game machine 200 is described as being divided into a process in an odd-numbered frame and a process in an even-numbered frame. Note that the "odd-numbered frame" and the "even-numbered frame" are merely so called for convenience. In other words, if one frame is assumed to be an odd-numbered frame, frames before and after that frames are even-numbered frames. Conversely, if one frame is assumed to be an even-numbered frame, frames before and after that frames are odd-numbered frames.

Figure 12:
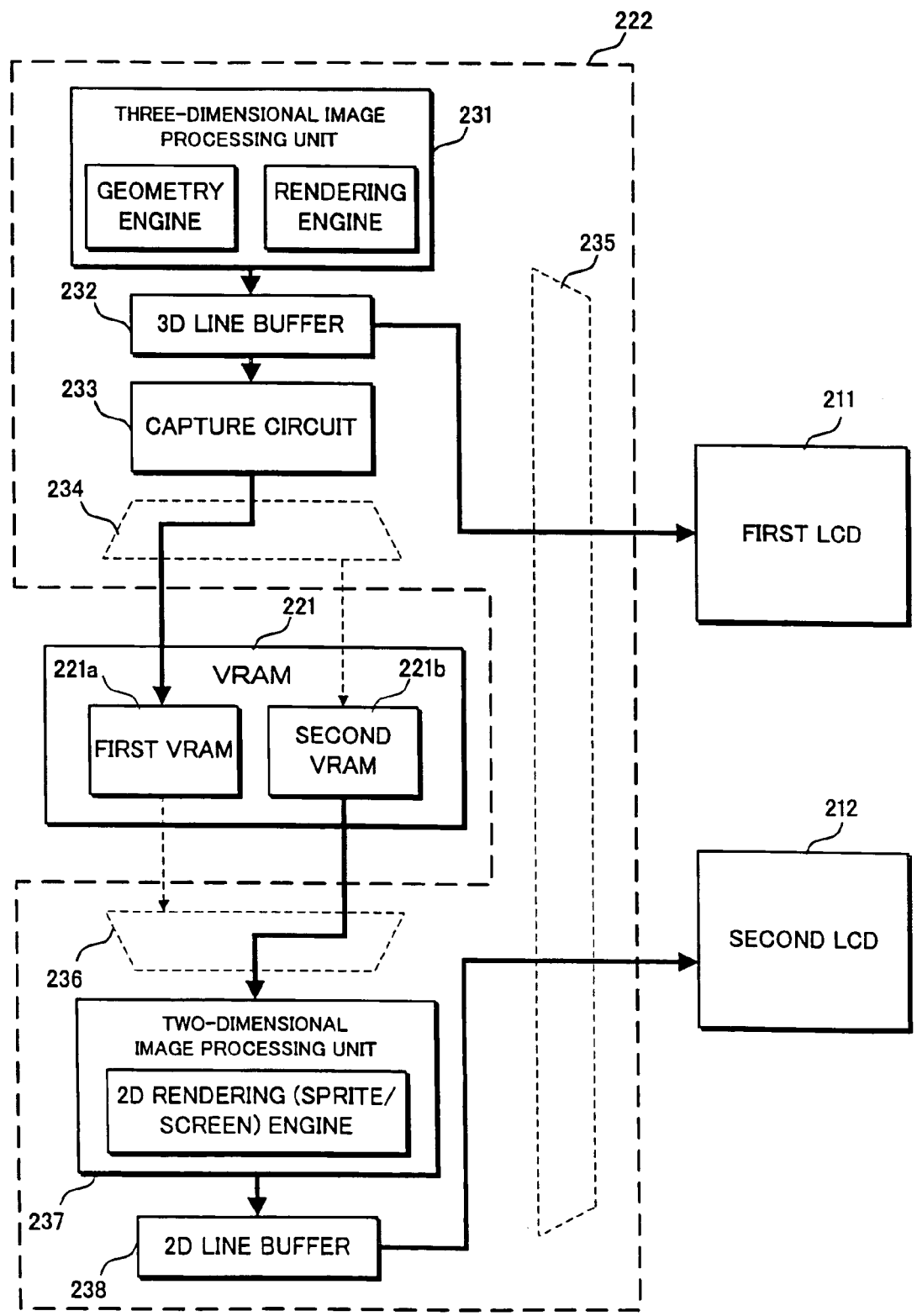
FIG. 12 is an illustration showing the operation of a portable game machine in an odd-numbered frame.

FIG. 12 is an illustration showing the operation of the portable game machine 200 in an odd-numbered frame. As shown in FIG. 12, in the odd-numbered frame, the game image generated by the three-dimensional image processing unit 231 is supplied via the 3D line buffer 232 to the first LCD 211. Also, the output from the capture circuit 233 is supplied to the first VRAM 221a. That is, the game image supplied in this frame to the first LCD 211 is captured by the capture circuit 233, and is then stored in the first VRAM 221a. Also, the two-dimensional image processing unit 237 reads the game image stored in the second VRAM 221b (the game image captured in the immediately-preceding even-numbered frame by the capture circuit 233, as will be described further below). This game image is, as will be described further below, identical to the game image supplied in the immediately-preceding even-numbered frame to the second LCD 212. The game image read by the two-dimensional image processing unit 237 is supplied via the 2D line buffer 238 to the second LCD 212. As such, in the odd-numbered frame, the game image generated in this frame by the three-dimensional image processing unit 231 is supplied to the first LCD 211, while the game image generated in the immediately-preceding even-numbered frame by the three-dimensional image processing unit 231 is supplied to the second LCD 212.

Figure 13:
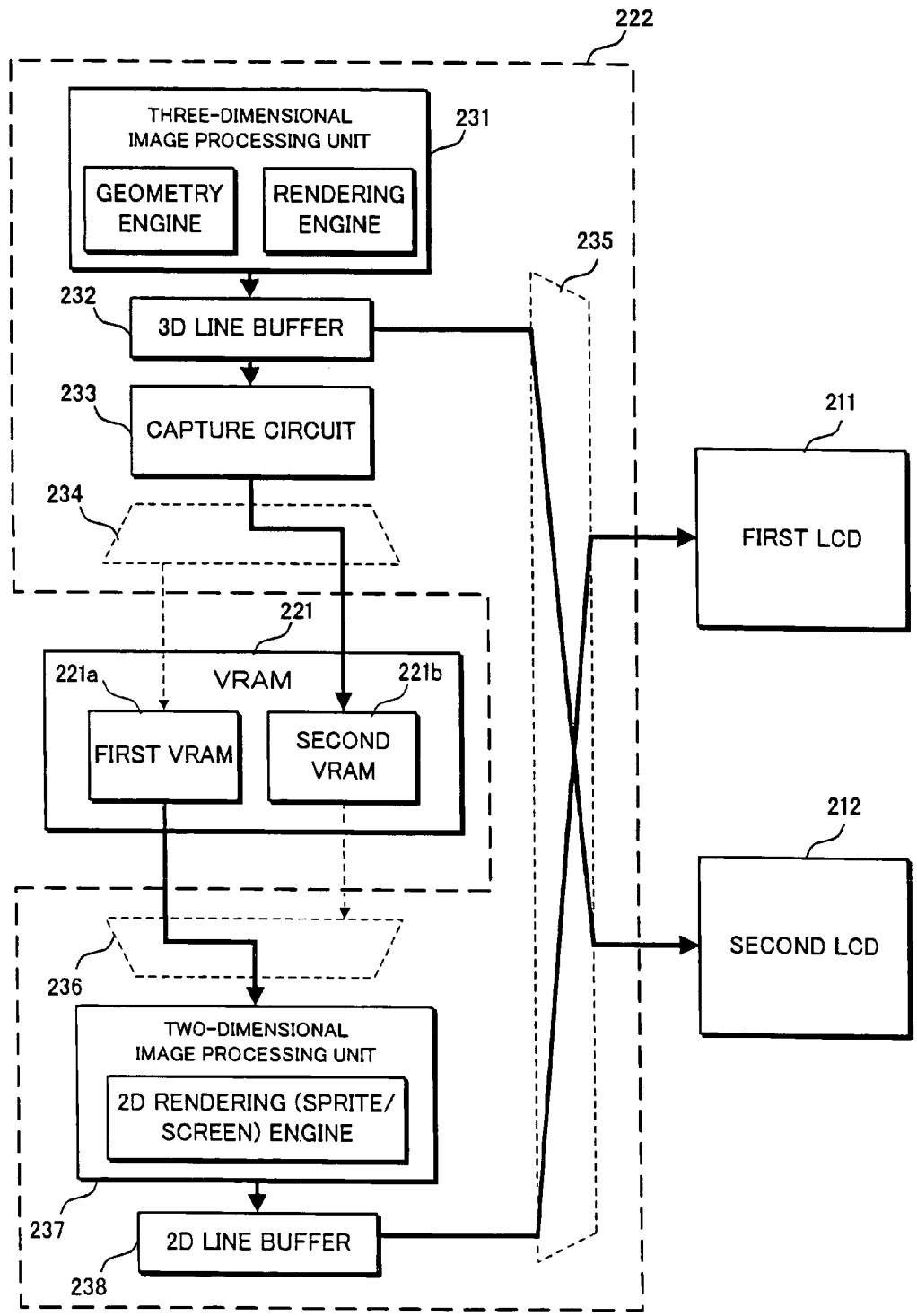
FIG. 13 is an illustration showing the operation of the portable game machine in an even-numbered frame.

FIG. 13 is an illustration showing the operation of the portable game machine 200 in an even-numbered frame. As shown in FIG. 13, in the even-numbered frame, the game image generated by the three-dimensional image processing unit 231 is supplied via the 3D line buffer 232 to the second LCD 212. Also, the output from the capture circuit 233 is supplied to the second VRAM 221b. That is, the game image supplied in this frame to the second LCD 212 is captured by the capture circuit 233, and is then stored in the second VRAM 221b. Also, the two-dimensional image processing unit 237 reads the game image stored in the first VRAM 221a (the game image captured in the immediately-preceding odd-numbered frame by the capture circuit 233, as will be described further below). This game image is identical to the game image supplied in the immediately-preceding odd-numbered frame to the first LCD 211. The game image read by the two-dimensional image processing unit 237 is supplied via the 2D line buffer 238 to the first LCD 211. As such, in the even-numbered frame, the game image generated in this frame by the three-dimensional image processing unit 231 is supplied to the second LCD 212, while the game image generated in the immediately-preceding odd-numbered frame by the three-dimensional image processing unit 231 is supplied to the first LCD 211.

Figure 14:
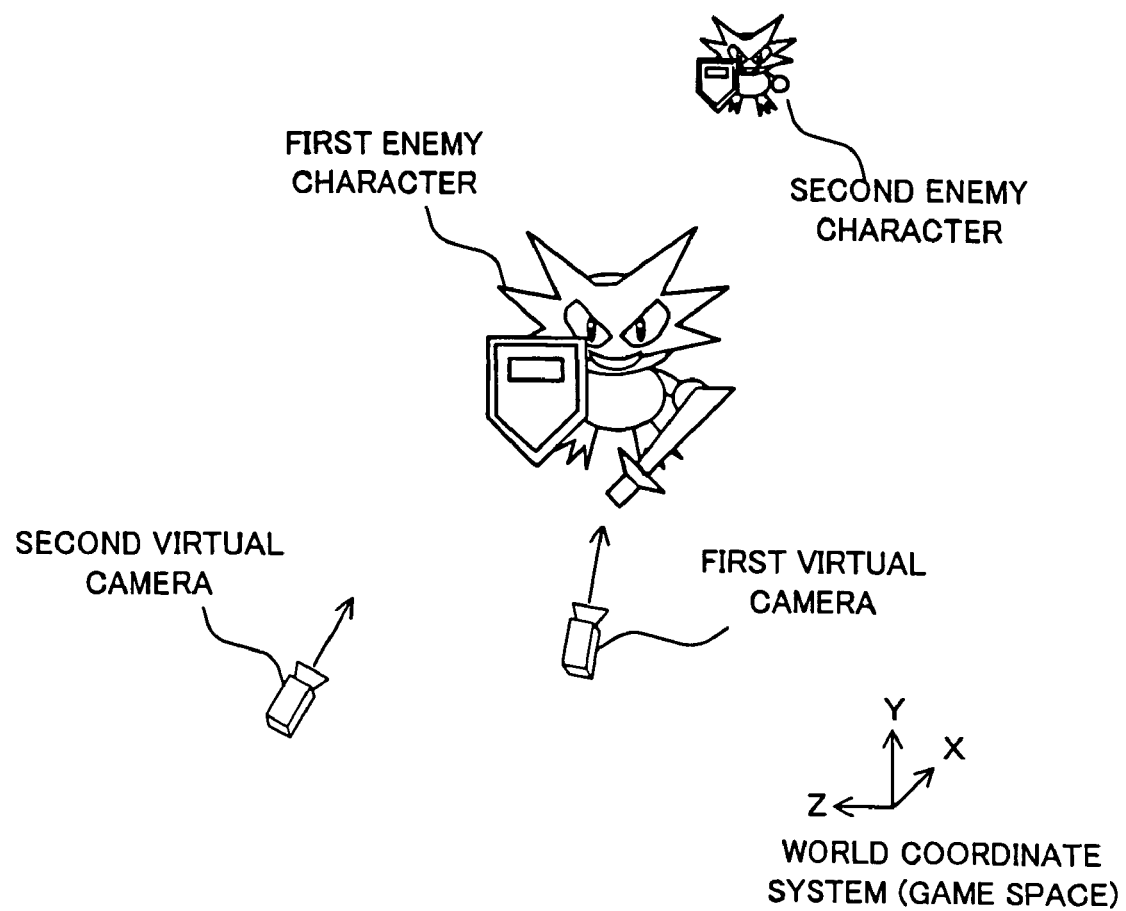
FIG. 14 is an illustration showing one example of a virtual three-dimensional game space.

In the present embodiment, the three-dimensional image processing unit 231 generates a game image representing a state in a virtual three-dimensional game space captured by virtual cameras different for odd-numbered and even-numbered frames. FIG. 14 is an illustration showing one example of the virtual three-dimensional game space. In FIG. 14, this virtual three-dimensional game space has disposed therein a first enemy character and a second enemy character as well as two virtual cameras, that is, a first virtual camera and a second virtual camera. In each odd-numbered frame, the three-dimensional image processing unit 231 generates a game image representing a state in a virtual three-dimensional game space captured by the first virtual camera. In each even-numbered frame, the three-dimensional image processing unit 231 generates a game image representing a state in a virtual three-dimensional game space captured by the second virtual camera. Alternatively, the three-dimensional image processing unit 231 may be provided with a plurality of virtual three-dimensional game spaces for generating, for odd-numbered and even-numbered frame, game images representing different states in the virtual three-dimensional game space.

Figure 15:
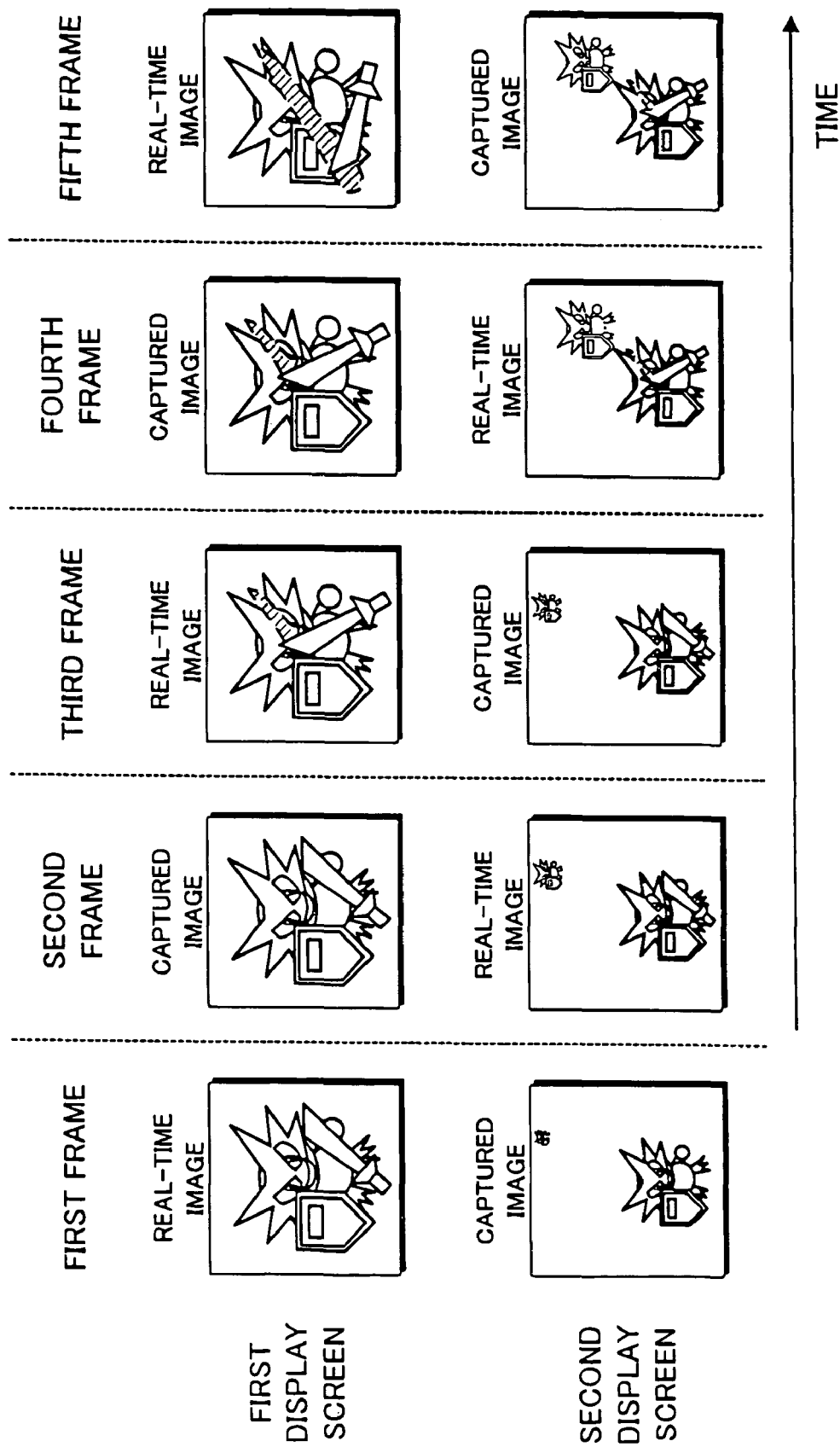

Examples of the game screen displayed on the first display screen 211a and the second display screen 212a based on the above-described operation of the portable game machine 200 are illustrated in FIG. 15. As can be seen from FIG. 15, in each odd-numbered frame, a game image generated in that frame by the three-dimensional image processing unit 231 (such an image is hereinafter referred to as a real-time image) is displayed on the first display screen 211a, while a game image generated in the immediately-preceding frame by the three-dimensional image processing unit 231 then captured by the capture circuit 233 (such an image is hereinafter referred to as a captured image) is displayed on the second display screen 212a. On the other hand, in each even-numbered frame, a game image (real-time image) generated in that frame by the three-dimensional image processing unit 231 is displayed on the second display screen 212a, while a game image (captured image) generated in the immediately-preceding frame by the three-dimensional image processing unit 231 and then captured by the capture circuit 233 is displayed on the first display screen 211a.

As such, in the present embodiment, a real-time image and a captured image are alternately displayed on the first display screen 11a and the second display screen 212a. Then, on the first display screen 211a, a game image representing the state of the virtual three-dimensional game space captured by the first virtual camera is displayed, while on the second display screen 212a, a game image representing the state of the virtual three-dimensional game space captured by the second virtual camera is displayed. Note that, as evident from FIG. 15, game images are displayed for each frame on the first and second display screens 211a and 212a, thereby preventing flicker on the display screens.

Figure 16:
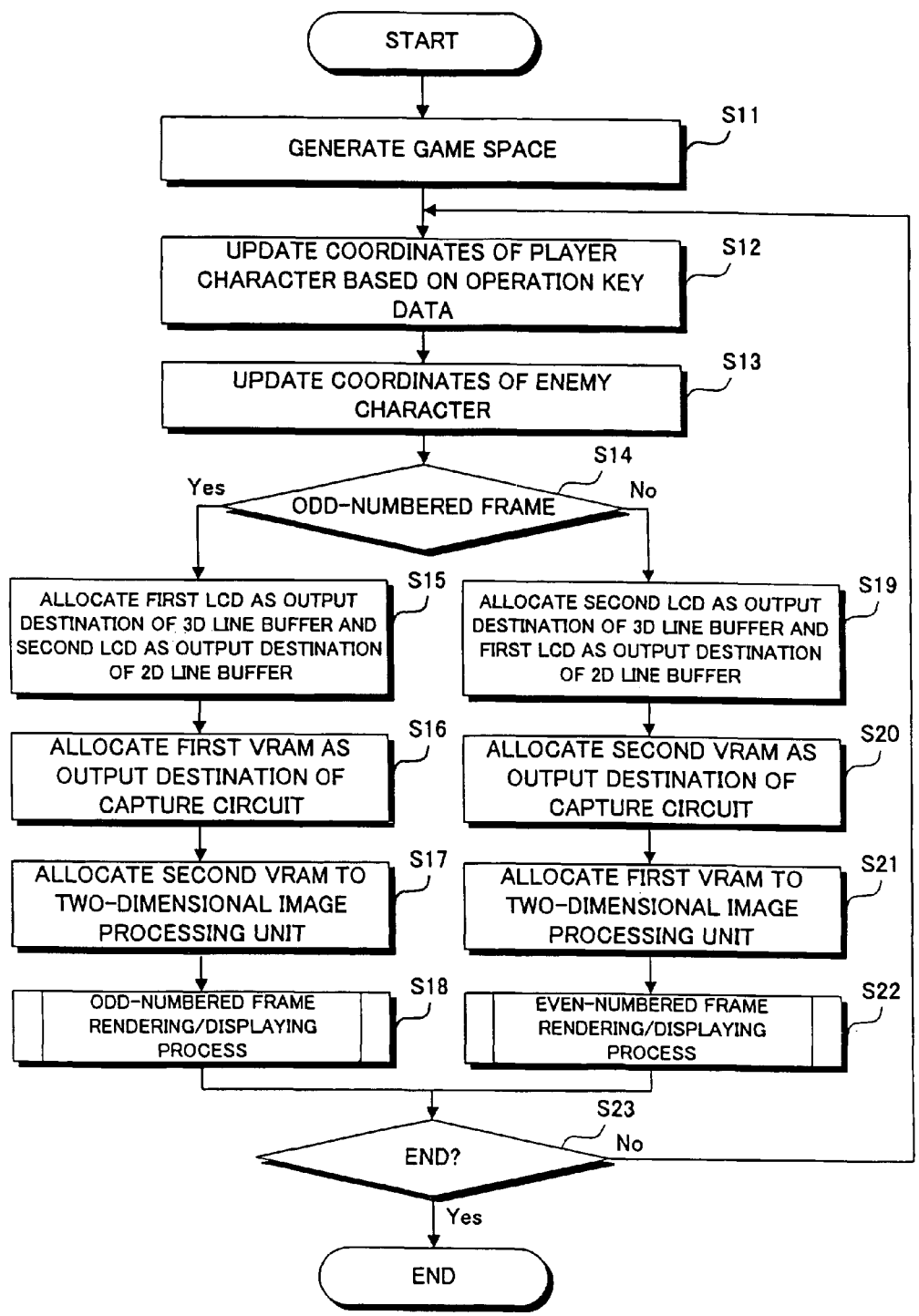
FIG. 16 is a flowchart showing the operation of an example portable game machine.
Figure 17:
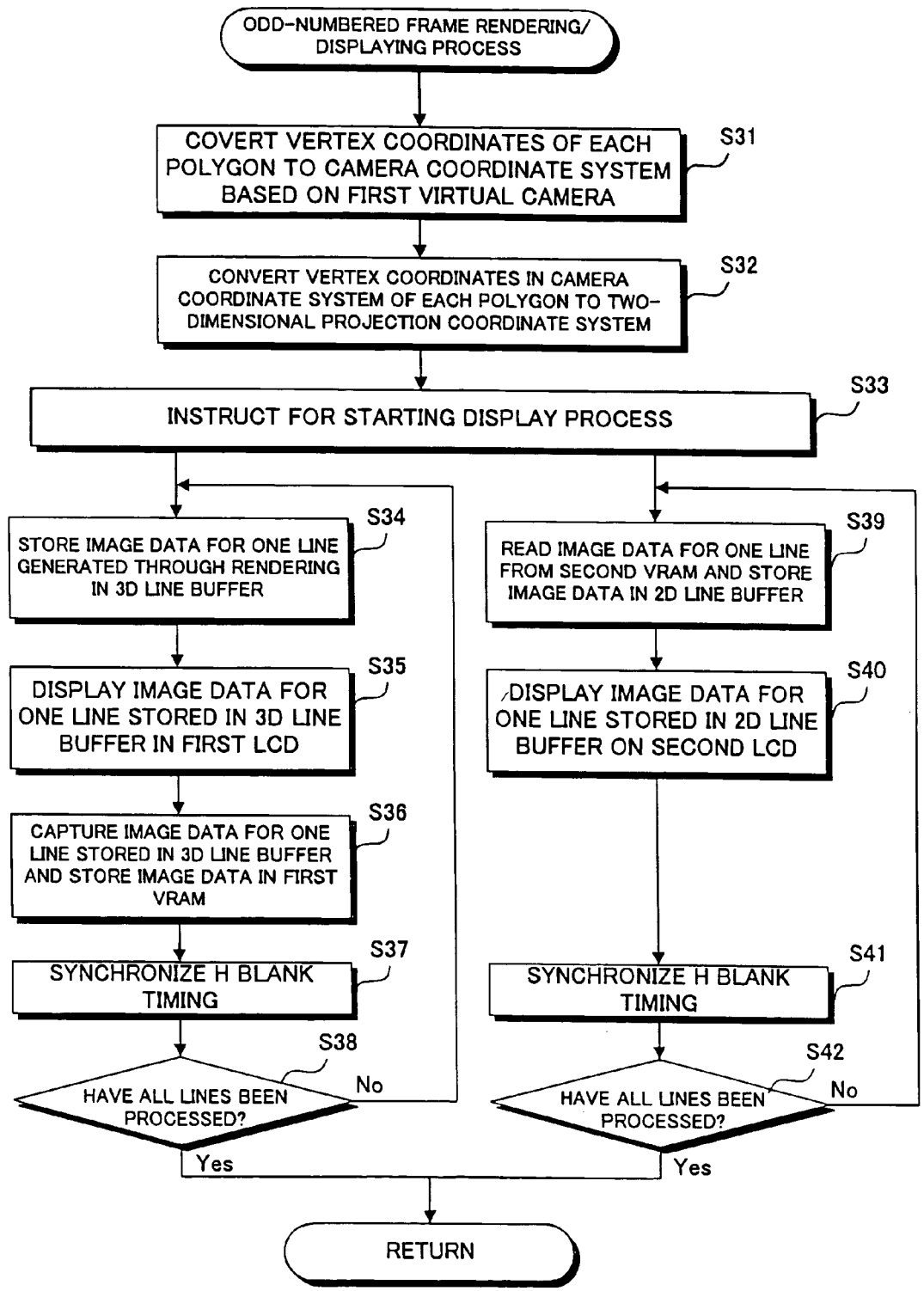
FIG. 17 is a flowchart showing a flow of an odd-numbered frame rendering/displaying process.
Figure 18:
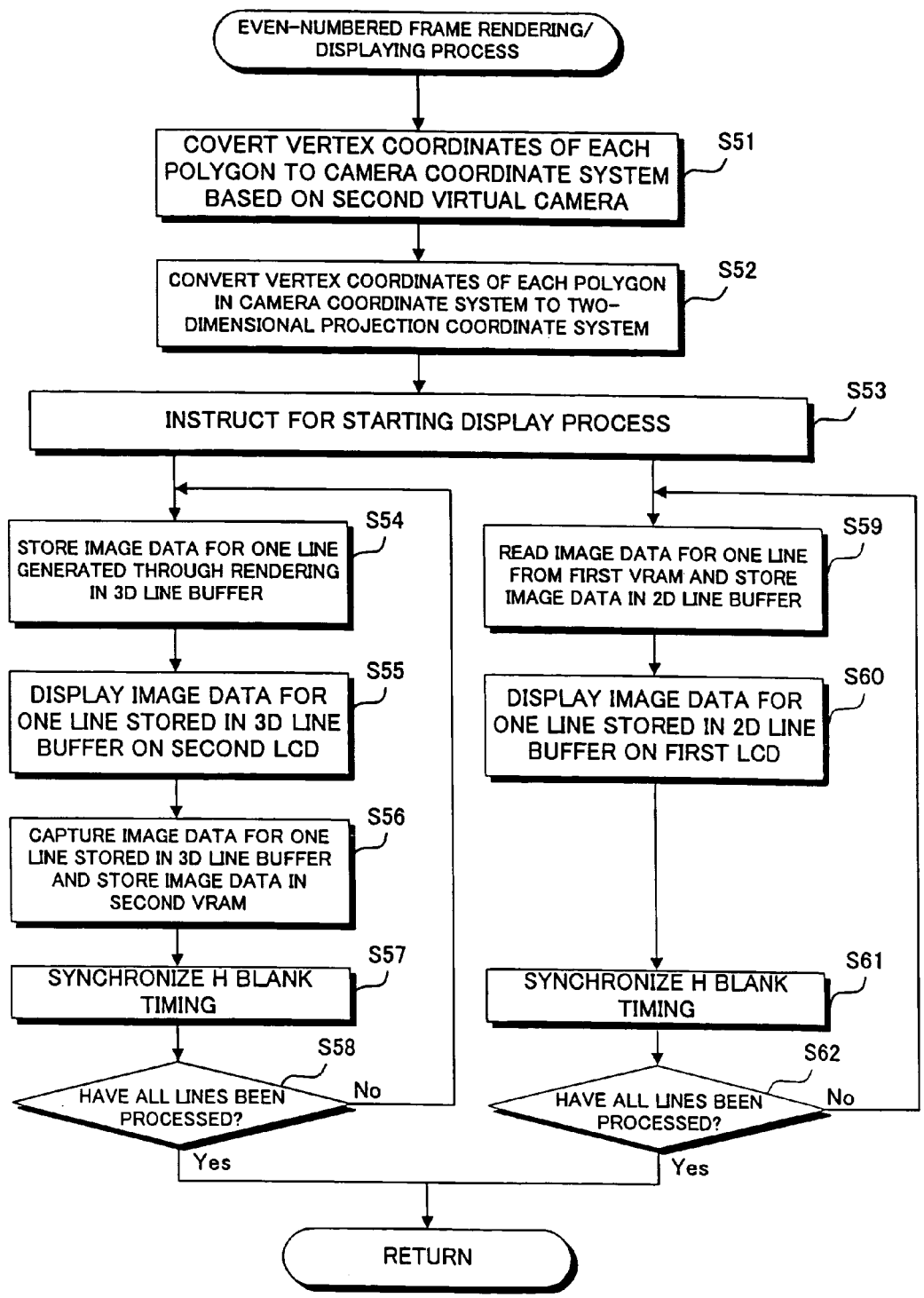
FIG. 18 is a flowchart showing a flow of an even-numbered frame rendering/displaying process.

With reference to FIGS. 16 through 18, the operation of the portable game machine 200 is described in more detail. Here, steps S11 through S17, S19 through S21, and S23 shown in FIG. 16 are described as process steps to be performed in the CPU 223 based on the game program stored in the program ROM 217a of the cartridge 217. However, any of these process steps may be achieved only by hardware.

In FIG. 16, the CPU 223 generates a virtual three-dimensional game space (S11). Specifically, in this process, world coordinates of each vertex of three-dimensional models, such as a player character and enemy characters, formed by a plurality of polygons are set at initial values. Next, based on operation key data output from the operation keys 214, the CPU 223 updates the coordinates of the player character in the virtual three-dimensional game space (S12), and then updates the coordinates of each enemy character in the virtual three-dimensional game space based on a predetermined algorithm (S13).

The CPU 223 then determines whether the current frame is an odd-numbered frame (S14).

When the current frame is an odd-numbered frame, the CPU 223 allocates the first LCD 211 as the output destination of the 3D line buffer 232 and the second LCD 212 as the output destination of the 2D line buffer 238 (S15). Furthermore, the CPU 223 allocates the first VRAM 221a as the output destination of the capture circuit 233 (S16), and the second VRAM 221b to the two-dimensional image processing unit 237 (S17). Thereafter, an odd-numbered frame rendering/displaying process (S18) is performed, and then the procedure goes to step S23. Details of the odd-numbered frame rendering/displaying process are described further below.

On the other hand, when the current frame is an even-numbered frame, the CPU 223 allocates the second LCD 212 as the output destination of the 3D line buffer 232 and the first LCD 211 as the output destination of the 2D line buffer 238 (S19). Furthermore, the CPU 223 allocates the second VRAM 221b as the output destination of the capture circuit (S20) and the first VRAM 221a to the two-dimensional image processing unit 237 (S21). Thereafter, an even-numbered frame rendering/displaying process (S22) is performed, and then the procedure goes to step S23. Details of the even-numbered frame rendering/displaying process are described further below.

In step S23, the CPU 223 determines whether the game is over. If the game continues, the procedure returns to step S12. If the game is over, the procedure ends.

Next, the details of the odd-numbered frame rendering/displaying process are described with reference to FIG. 17. The odd-numbered frame rendering/displaying process is performed by the GPU 222 based on instructions from the CPU 223.

First, the geometry engine of the three-dimensional image processing unit 231 converts vertex coordinates (in the world coordinate system) of each polygon in the virtual three-dimensional game space to the two-dimensional projection coordinate system (S32). When conversion of the vertex coordinates of each polygon is completed, an instruction for starting a display process is issued from the GPU 222 to the rendering engine of the three-dimensional image processing unit 231 and the 2D rendering engine of the two-dimensional image processing unit (S33). Upon reception of this instruction, the rendering engine of the three-dimensional image processing unit 231 and the 2D rendering engine of the two-dimensional processing unit concurrently perform their respective processes.

Upon reception of the display process starting instruction, the rendering engine of the three-dimensional image processing unit 231 generates image data for the first one line through a rendering process based on the results of conversions of the vertex coordinates of each polygon, and then stores the generated image data in the 3D line buffer 232 (S34). Then, the image data for one line stored in this 3D line buffer 232 is supplied to the first LCD 211, and is then displayed on the first display screen 211a (S35). Also, the image data for one line stored in the 3D line buffer 232 is stored in a predetermined area of the first VRAM 221a by the capture circuit 233 (S36). Then, after waiting for an H blank timing (horizontal blanking period) in order to establish horizontal synchronization (S37), the rendering engine performs a process similar to the above for the next line. That is, the rendering engine of the three-dimensional image processing unit 231 generates image data for the next one line, and then stores the generated image data in the 3D line buffer 232 (S34). Thereafter, until all lines have been completely processed (that is, until the entire screen has been completely processed), processes of steps S34 through S37 are repeated.

Upon reception of the display process starting instruction, the 2D rendering engine of the two-dimensional image processing unit 237 reads image data for the first one line of the game image stored in the second VRAM 221b, and then stores the read image data in the 2D line buffer 238 (S39). Then, the image data for one line stored in this 2D line buffer 238 is supplied to the second LCD 212, and is then displayed on the second display screen 212a (S40). Then, after waiting for an H blank timing (horizontal blanking period) in order to establish horizontal synchronization (S41), the 2D rendering engine performs a process similar to the above. That is, the 2D rendering engine of the two-dimensional image processing unit 237 reads image data for the next one line from the second VRAM 221b, and then stores the read image data in the 2D line buffer 238 (S39). Thereafter, until all lines have been completely processed (that is, until the entire screen has been completely processed), processes of steps S39 through S41 are repeated.

When all lines have been completely processed by the rendering engine of the three-dimensional image processing unit 231 and the 2D rendering engine of the two-dimensional image processing unit 237, the odd-numbered frame rendering/displaying process ends.

Next, the details of the even-numbered frame rendering/displaying process are described with reference to FIG. 18. This even-numbered rendering/displaying process is performed by the GPU 222 based on instructions from the CPU 223.

First, the geometry engine of the three-dimensional image processing unit 231 converts vertex coordinates (in the world coordinate system) of each polygon in the virtual three-dimensional game space to the camera coordinate system (S51). Furthermore, the geometry engine of the three-dimensional image processing unit 231 converts these vertex coordinates (in the camera coordinate system) to the two-dimensional projection coordinate system (S52). When conversion of the vertex coordinates of each polygon is completed, an instruction for starting a display process is issued from the GPU 222 to the rendering engine of the three-dimensional image processing unit 231 and the 2D rendering engine of the two-dimensional image processing unit (S53). Upon reception of this instruction, the rendering engine of the three-dimensional image processing unit 231 and the 2D rendering engine of the two-dimensional processing unit concurrently perform their respective processes.

Upon reception of the display process starting instruction, the rendering engine of the three-dimensional image processing unit 231 generates image data for the first one line through a rendering process based on the results of conversions of the vertex coordinates of each polygon, and then stores the generated image data in the 3D line buffer 232 (S54). Then, the image data for one line stored in this 3D line buffer 232 is supplied to the second LCD 212, and is then displayed on the second display screen 212a (S55). Also, the image data for one line stored in the 3D line buffer 232 is stored in a predetermined area of the second VRAM 221b by the capture circuit 233 (S56). Then, after waiting for an H blank timing (horizontal blanking period) in order to establish horizontal synchronization (S57), the rendering engine performs a process similar to the above for the next line. That is, the rendering engine of the three-dimensional image processing unit 231 generates image data for the next one line, and then stores the generated image data in the 3D line buffer 232 (S54). Thereafter, until all lines have been completely processed (that is, until the entire screen has been completely processed), processes of steps S54 through S7 are repeated.

Upon reception of the display process starting instruction, the 2D rendering engine of the two-dimensional image processing unit 237 reads image data for the first one line of the game image stored in the first VRAM 221a, and then stores the read image data in the 2D line buffer 238 (S59). Then, the image data for one line stored in this 2D line buffer 238 is supplied to the first LCD 211, and is then displayed on the first display screen 211a (S60). Then, after waiting for an H blank timing (horizontal blanking period) in order to establish horizontal synchronization (S61), the 2D rendering engine performs a process similar to the above. That is, the 2D rendering engine of the two-dimensional image processing unit 237 reads image data for the next one line from the first VRAM 221a, and then stores the read image data in the 2D line buffer 238 (S59). Thereafter, until all lines have been completely processed (that is, until the entire screen has been completely processed), processes of steps S59 through S61 are repeated.

When all lines have been completely processed by the rendering engine of the three-dimensional image processing unit 231 and the 2D rendering engine of the two-dimensional image processing unit 237, the even-numbered frame rendering/displaying process ends.

As described above, according to the portable game machine 200 of the present embodiment, by using the single three-dimensional image processing unit 231, different three-dimensional game images can be simultaneously displayed on the first LCD 211 and the second LCD 212 without flicker on the display screens.

Figure 19:
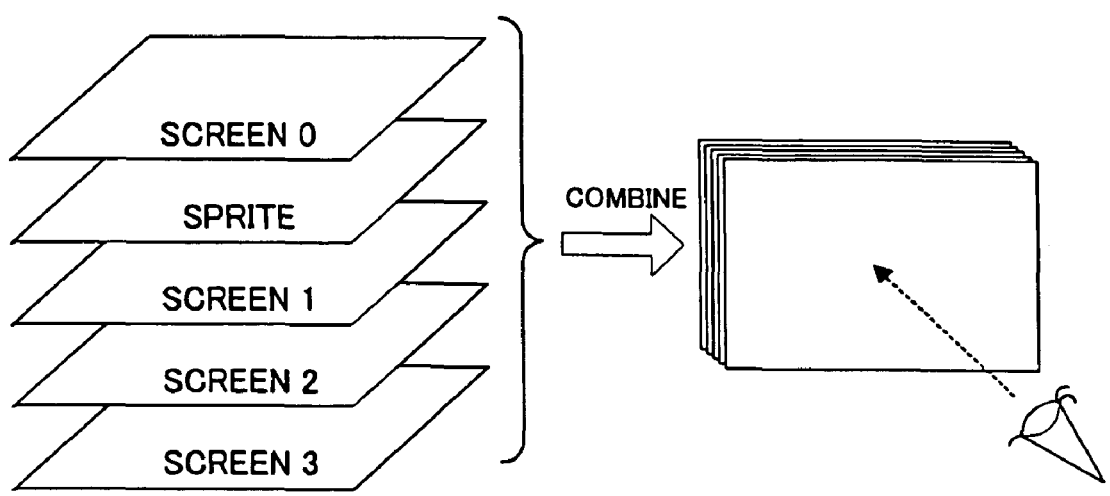
FIG. 19 is an illustration showing an original two-dimensional game image generating process to be performed by a two-dimensional image processing unit 37.
Figure 20:
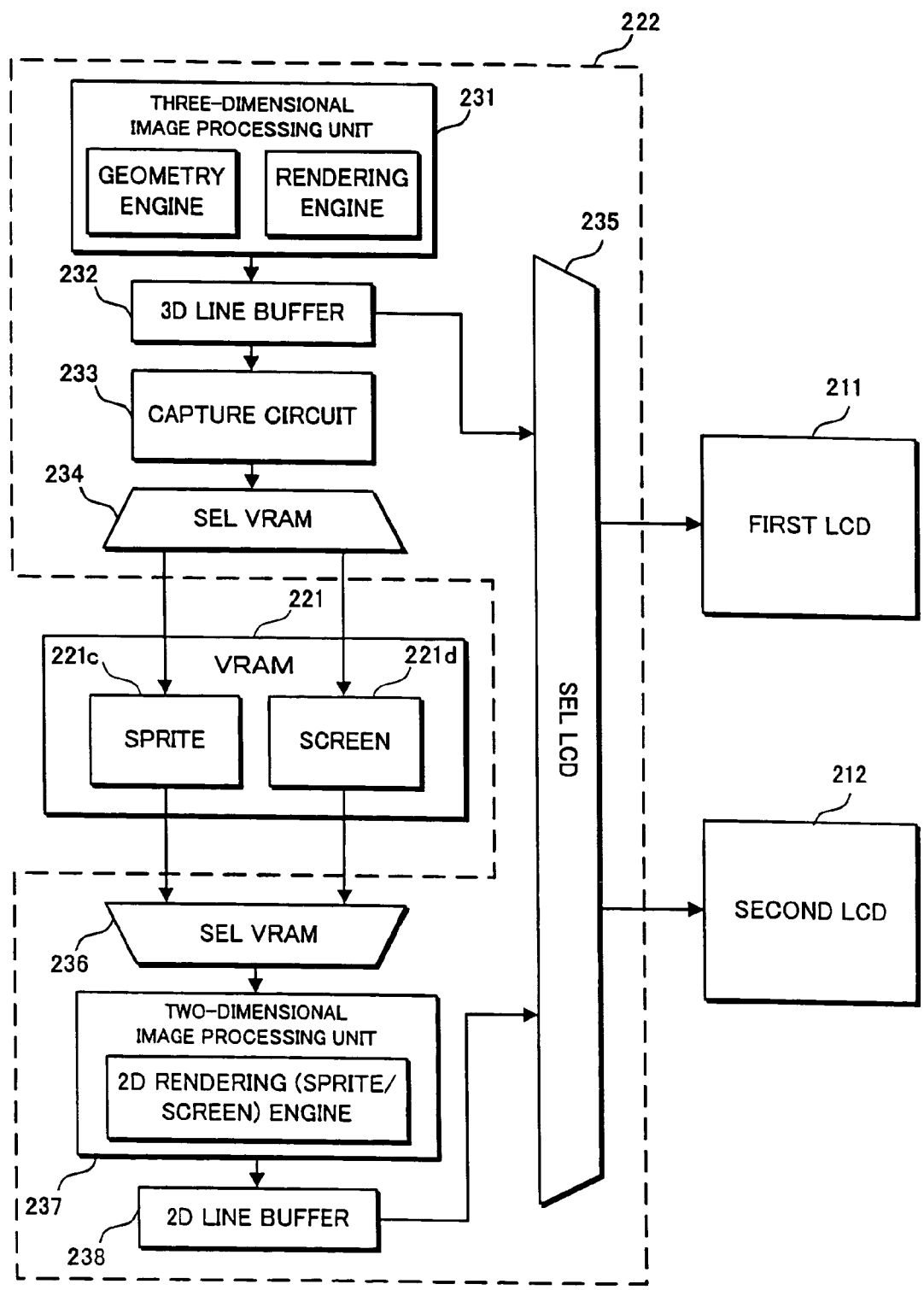
FIG. 20 is an illustration showing an internal configuration of a GPU 22 according to an exemplary modification of the present invention.

As described above, when generating a normal two-dimensional game image, the two-dimensional image processing unit 237 disposes a two-dimensional image representing a character on the virtual screen called a "sprite" and a two-dimensional image representing a background on the virtual screen called a "screen", and then synthesizes these virtual screens to generate a game image to be eventually displayed. There might be the case where a plurality of "screens" are present. FIG. 19 shows an example in which five virtual screens, that is, a sprite and screens 0 through 3, are synthesized to form a two-dimensional game image. As an exemplary modification of the present embodiment, any two of these virtual screens can be used in place of the first VRAM 221a and the second VRAM 221b. The structure of the portable game machine 200 in that case is exemplarily shown in FIG. 20. In the example of FIG. 20, a sprite area 221c and a screen area 221d are used in place of the first VRAM 221a and the second VRAM 221b. Hereinafter, the operation in the exemplary modification is briefly described.

The capture circuit 233 stores the game image captured in each odd-numbered frame in the sprite area 221c of the VRAM 221 and the game image captured in each even-numbered frame in the screen area 221d of the VRAM 221. When generating a normal two-dimensional game image, the two-dimensional image processing unit 237 generates a two-dimensional game image formed by synthesizing the "sprite" and the "screen" and then outputs the generated image to the 2D line buffer 238. In the exemplary modification, however, in each odd-numbered frame, the two-dimensional image processing unit 237 generates a game image formed of only the "screen", and then outputs the generated game image via the 2D line buffer 238 to the second LCD 212. In each even-numbered frame, the two-dimensional image processing unit 237 generates a game image formed of only the "sprite", and then outputs the generated game image via the 2D line buffer 238 to the first LCD 211. As a result, game images similar to those shown in FIG. 15 are displayed on the first display screen 211a and the second display screen 212a.

As such, selecting a desired virtual screen from a plurality of virtual screens for display is a function originally provided to the two-dimensional image processing unit 237. Therefore, no special function has to be added to the two-dimensional image processing unit. Also, an additional storage area for temporarily storing the game image captured by the capture circuit 233 is not required, thereby suppressing cost required for the portable game machine 200.

Figure 21:
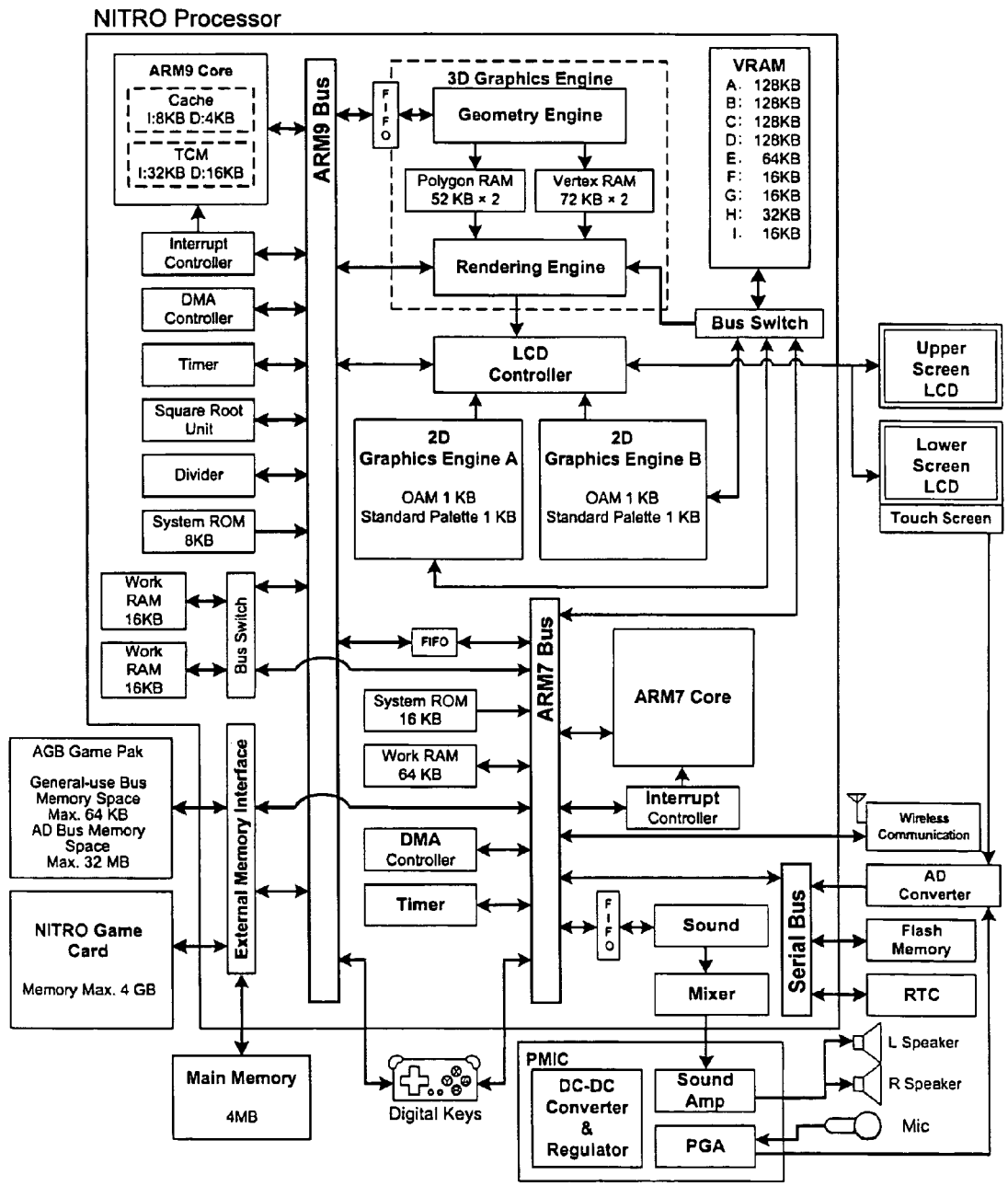
FIG. 21 is a more detailed overall system block diagram of the example portable game system.

FIG. 21 is a more detailed overall system block diagram of the example portable game machine. As shown in this diagram, the processor is a combined chip that consolidates two processors (e.g., ARM9 and ARM7 CPU cores such as ARM946E-S at 67.028 MHz and ARM7TDMI at 33.514 MHz) with portable game system features and memory for the 2D and 3D graphics engines. The 2D graphics engines A and B operate at 33.514 MHz. The 3D graphics engine includes a geometry engine and a rendering engine.

The following devices connect to the ARM7 sub-processor: the wireless communications circuit, a portion of the digital keys, the sound, touch screen, microphone, real time clock (RTC) and built-in flash memory. These devices may be accessed using an Application Program Interface (API) regardless of what state the ARM7 sub-processor is in. An API is a group of functions that increase efficiency when developing applications and is used in low-level system calls and to control hardware. When an AGB Game Pak is connected to the portable game machine, the sub-processor starts up at 16.777 MHz. In this "AGB Game Pak" mode, the LCD1 screen, the 2D graphics engine, the LCD controller and a part of the VRAM are usable, but the ARM9 and ARM9-related peripheral circuitry, the 3D graphics engine and the serial bus are not usable. Because the serial bus becomes unusable, the wireless communication circuitry, the touch screen, the RTC, the microphone and the built-in flash memory connected to that bus are also unusable. In addition, the X and Y buttons become unusable.

An example geometry engine has the following features:
operates at 33.514 MHz
maximum 4 million vertices/second
6-plane clipping
Lighting (4 parallel light sources)
matrix stack
texture coordinate conversion
box culling test
An example rendering engine has the following features:
operates at 33.514 MHz
maximum 120 thousand polygons/second
maximum 30 million pixels/second
triangular and quadrilateral rendering
texture format:
4-, 16-, and 256-color palette formats bitmap format
4×4 texel compression format
translucent (A3I5, A5I3) format
texture size: 8×8 to 1024×1024
alpha blending
alpha test
fog
toon shading
edge marking
anti-aliasing The example portable game machine includes various memories. System ROM for the ARM9 core is 8 KB (2K×32 bit) and system ROM for the ARM7 core is 16 KB (4K×32 bit). Internal work RAM shared by the ARM9 and the ARM7 is 32 KB (8K×32 bit) and ARM7 dedicated work RAM is 64 KB (16K×32 bit). Work RAM does not have a fixed us and so it can be assigned for each application in the ways that make the most efficient use of memory resources. This ability is called WRAM bank control.

There is a total of 656 KB of VRAM A to VRAM I (128 KB+128 KB+128 KB+128 KB+64 KB+16 KB+16 KB+32 KB+16 KB). VRAM A to I does not have a fixed use, so it can be assigned for each application in the ways that make the most efficient use of memory resources. This ability is called VRAM bank control. For example, VRAM A to D can be used as memory for holding bitmap data during VRAM display mode and it can also be set as memory for writing bitmap data during captures.

The main memory is 4 MB and is connected to the processor as an independent chip. Because the game card bus is not mapped to the processor address space, application and data must be executed after loading them into main memory.

The on-board wireless communication circuit is capable of using the 2.4 GHz bandwidth. The following modes are available:
Internet Play that allows connections to wireless LAN access points
Multi-Card play that enables communication with up to 16 other devices
Single-Card play that downloads games from a parent device to child devices that are not equipped with game cards With reference to FIG. 22, in an illustrative embodiment, the displayed 2D graphics are composed of OBJ (object), BG (background) and the Backdrop. An OBJ is a relatively small image, but several of them can be displayed. They are mainly used to display characters that moves around the screen. A BG has features equivalent to an OBJ, but only a few BG screens can be displayed because a BG is large and consumes a lot of memory. A BG is used to display large images such as objects that are continuously on-screen or in the background.

Regions of the LCD screen where no OBJ and BG are displayed are filled with a single color. This region is called the Backdrop and be visualized as a single-color surface that is always displayed furthest in the back, as depicted in FIG. 22. The Backdrop is a surface filled only with a single color and does not have the features of OBJ and BG. The Backdrop color can be changed with a palette.

The example portable game system allocates RAM specifically for BG and OBJ palettes (palette RAM). Data stored in palette RAM are called standard palettes. Extended palettes allowing use of 256 colors×16 palettes may also be used. Standard palette RAM is allocated separately for OBJ and for BG in both 2D graphics engine A and 2D graphics engine B. Color 0 in each palette is the transparent color. The Backdrop screen use the color set at the beginning of the BG palette (color 0 of palette 0). Because standard palette RAM resides inside the 2D graphics engines, the 2D graphics engine must be enabled before data can be written to its RAM.

The example portable game system may include window features that can restrict the regions where BGs and OBJs are displayed, as well as the region in which color special effects are applied. In one illustrative implementation, the system may be provided with three kinds of windows: Window 0, Window 1, and the OBJ Window as shown in FIG. 23. Window 0 always has display priority (precedence) over Window 1, and the OBJ Window has the lowest precedence. In this illustrative implementation, this precedence cannot be changed.

OBJ and BG can use special effects such as alpha-blending and fade-in/fade-out effects. These effects can be limited to a region by using windows, as noted above. For alpha-blending, computations are conducted are conducted and a 16-level translucency process is performed on two selected screens. This process is not performed on transparent portions (transparent pixels). Fade-in/Fade-out computations are conducted and a 16-level process of changing the brightness is performed on the selected screen. This process is not performed on transparent portions (transparent pixels).

BGs and OBJs have display priorities associated therewith. Four levels of display priority can be set for BGs using, for example, a BG control register. When BGs have the same priority, the one with the lower BG number has higher priority. The Backdrop screen always has the lowest priority.

Four levels of display priority can be set for OBJs using, for example, OBJ attribute data. When OBJs have the same priority, the one with the lower OBJ number has higher priority.

If an OBJ and a BG have the same priority, the OBJ has higher priority than the BG.

Figures 24, 28:
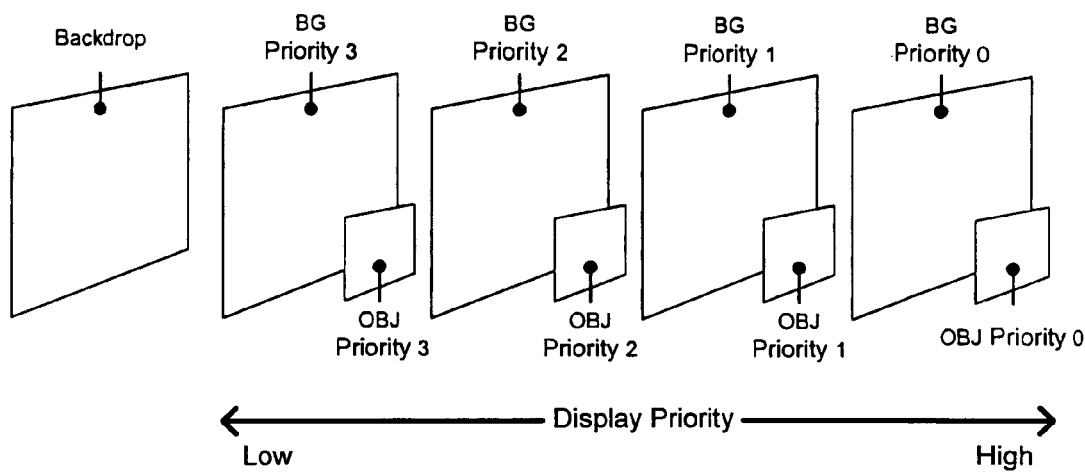
FIG. 24 shows the display priorities associated with backgrounds and objects for the example portable game system.
FIG. 28 shows an illustrative capture data format.

FIG. 24 illustrates the aforementioned display priorities.

Figure 25:
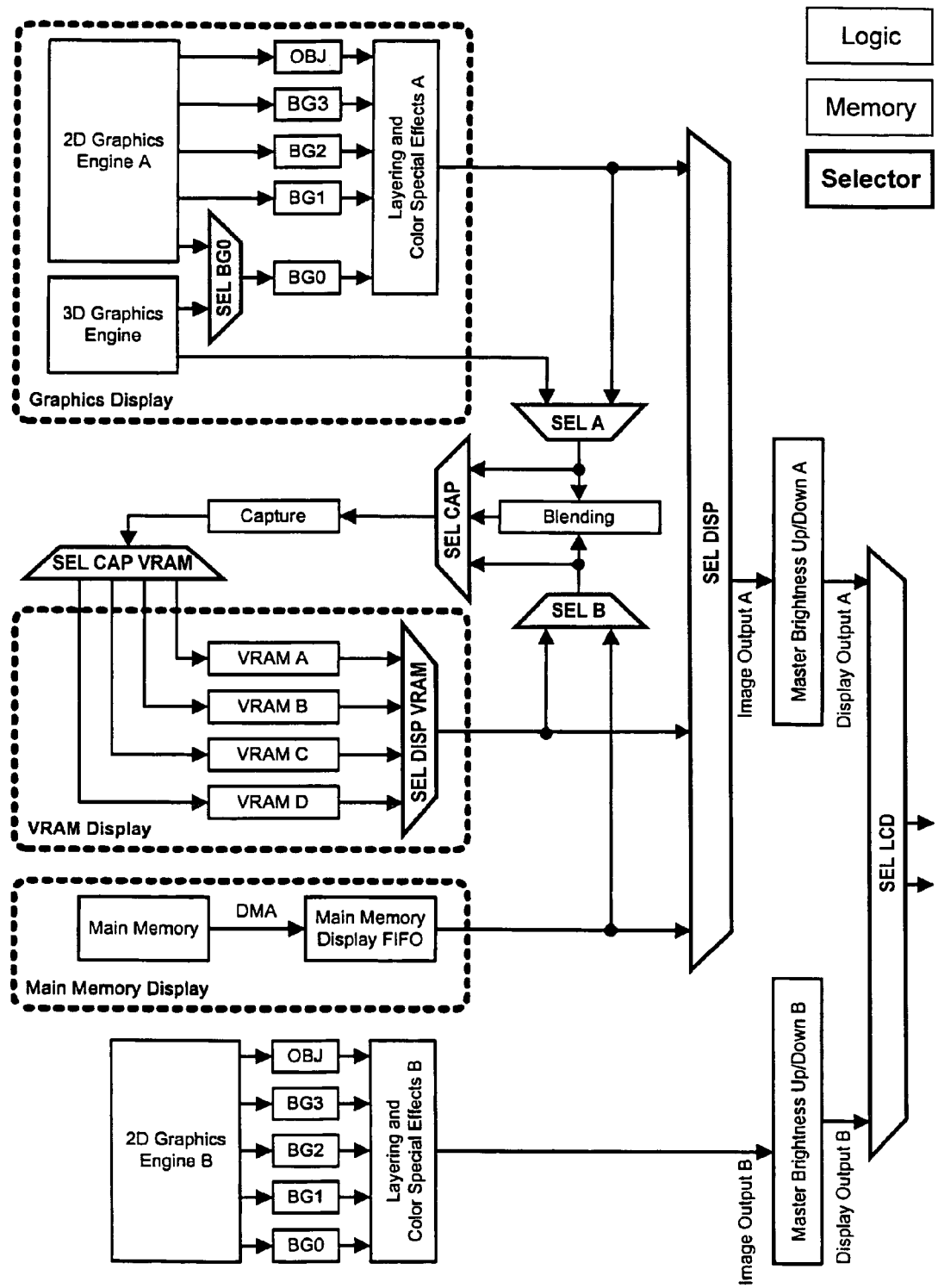
FIG. 25 provides a block diagram of the overall display system.

FIG. 25 provides a block diagram of the overall display system. Each of the selectors SEL shown in FIG. 25 can be controlled using register selection flags as set forth below. These registers will be discussed in greater detail below.

With reference to FIG. 25, after selecting the graphics display, VRAM display, or main memory display using SEL DISP, the image output becomes Image Output A. Similarly, the image output of the 2D graphics engine B becomes Image Output B. Image Output A allows blending and displaying of 2D graphics and 3D graphics in the graphics display. Image Outputs A and B each go through the Master Brightness Up/Down A and B, respectively, and become the Display Output A and Display Output B that are sent to the LCD. When finally output to the LCD, these display outputs cannot be layered. The display outputs may be sent as follows:

Send Display Output A to the Upper Screen LCD and send Display Output B to the Lower Screen LCD Send Display Output A to the Lower Screen LCD and Display Output B to the Upper Screen LCD For games that utilize only one LCD, the non-used LCD may be disabled.

Thus, on the Display Output A side, there are modes that display the bitmap data in the VRAM and main memory in addition to the mode that displays the images generated by the graphics circuit:

|  |  |  |  | Features | | | |
| --- | --- | --- | --- | --- | --- | --- | --- |
| Display Mode Number | Display Mode | Display Size | Frame Rate | 3D Display | Character BG Display | Bitmap BG Display | OBJ Display |
| 0 | Display OFF | — | — | — | — | — | — |
| 1 | Graphics Display | 256 × 192 | 60 fps | X | X | X | X |
| 2 | VRAM Display | 256 × 192 | 60 fps |  |  | X |  |
| 3 | Main Memory Display | 256 × 192 | 60 fps |  |  | X |  |

On the Display Output B side, the only mode selection is graphics display ON or OFF.

| Selector Name | Register Name | Flag Name |
| --- | --- | --- |
| SEL DISP | DISPCNT | Display mode selection |
| SEL BG0 | DISPCNT | 2D/3D display selection for BG0 |
| SEL DISP VRAM | DISPCNT | Display VRAM selection |
| SEL A | DISPCAPCNT | Capture source A selection |
| SEL B | DISPCAPCNT | Capture source B selection |
| SEL CAP | DISPCAPCNT | Capture mode selection |
| SEL CAP VRAM | DISPCAPCNT | Capture data write destination VRAM selection |
| SEL LCD | POWCNT | LCD output destination switch |

|  |  |  |  | Features | | |
| --- | --- | --- | --- | --- | --- | --- |
| Display Mode Number | Display Mode | Display Size | Frame Rate | Character BG Display | Bitmap BG Display | OBJ Display |
| 0 | Display OFF | — | — | — | — | — |
| 1 | Graphics Display | 256 × 192 | 60 fps | X | X | X |

The portable game machine includes various registers used in the implementation of the above-described functionalities, as well as other functionalities. These registers are in the address space of the CPU core which, for example, be an ARM9 core.

Figure 26A:
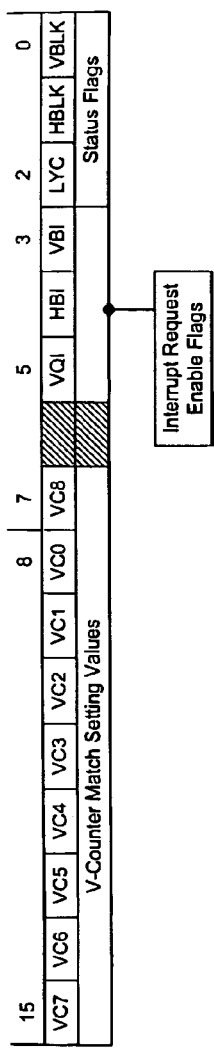
FIGS. 26(a)-26(f) show example registers of the example portable game system.

A first such register DISPSTAT (Display Status) is shown in FIG. 26(a). This register is a read/write register and is located, by way of example, at address 0x04000004 in the address space of the CPU core. The example register addresses mentioned herein adopt the little-endian method. Thus, in a sixteen bit register, the address for d15-d08 is one more than the address for d07-d00. Bits [d5-d07] are V-counter match setting values; bits [d05-d03] are interrupt request enable flags; and bits [d02-d00] are status flags. More specifically, VQI [d05] is a V-counter match interrupt request enable flag; HBI [d04] is an H-blank interrupt request enable flag; and VBI [d03] is a V-blank interrupt request enable flag. In an illustrative embodiment, for each of these flags, "0" represents a disabled state and "1" represents an enabled state. When enabled, H-blank interrupts are permitted and can be made during the display interval, and also during any of the 263 vertical lines on the LCD, including V-blank intervals.

Figure 26B:
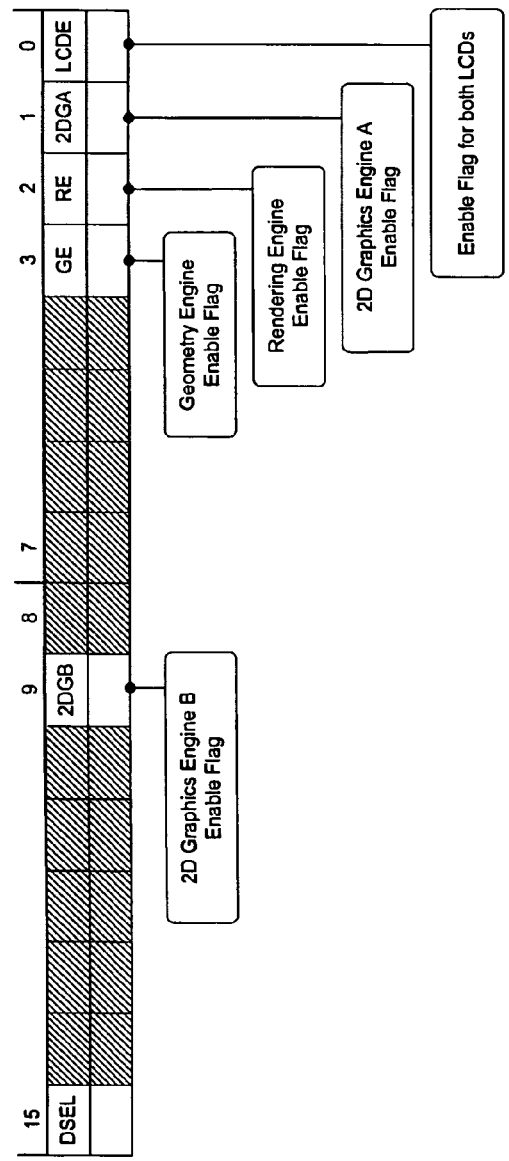

Another register POWCNT (Power Control) is shown in FIG. 26(b). This register is a read/write register and is located, by way of example, at address 0x04000304 in the address space of the CPU core. Bit d[15] is an LCD output destination switching flag; bit d[09] is a 2D graphics engine B enable flag; bit d[03] is a geometry engine enable flag; bit d[02] is a rendering engine enable flag; bit d[01] is a 2D graphics engine A enable flag; and bit d[00] is an enable flag for both LCDs. When DSEL [d15] is "0", Display Output A is sent to the lower screen LCD and Display Output B is sent to the upper screen LCD. When DSEL [d15] is "1", Display Output A is send to the upper screen LCD and Display Output B is sent to the lower screen LCD. The switching of the LCD output destination by appropriately configuring this register can occur without delay. When 2DGB[d09] is "0", graphics engine B is disabled and when 2DGB[d09] is "1", graphics engine B is enabled. This flag may be used to turn off graphics engine B when it is not being used in order to reduce power consumption. When 2DGA[d01] is "0", graphics engine A is disabled and when 2DGA[d01] is "1", graphics engine A is enabled. Here again, this flag may be used to turn off graphics engine A when it is not being used (for example, when only 3D graphics are being used) in order to reduce power consumption. When LCDE[d00] is disabled (for example, by being set to "0"), both the clock supply to upper and lower LCD controllers and the power supply to the upper and lower LCDs are stopped.

Figure 26C:
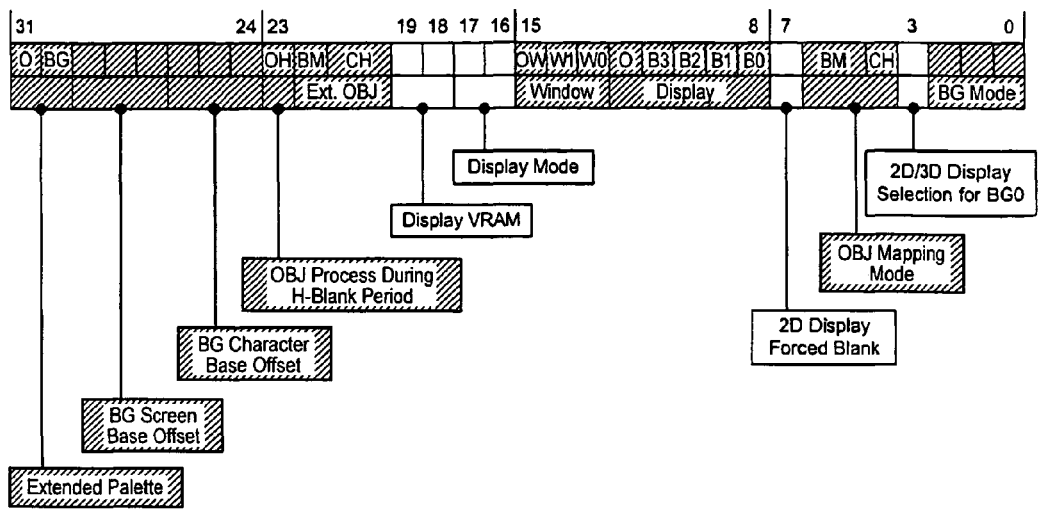

Another register DISPCNT (Display Control for 2D Graphics Engine A) is shown in FIG. 26(c). This register is a read/write register and is located, by way of example, at address 0x04000000 in the address space of the CPU core. Bit [d23] relates to OBJ processing during H-Blank period; bits [d19-d18] relate to VRAM display; bits [d17-d16] relate to display mode; bit [d07] relates to 2D display forced blanking; and bit [d03] relates to 2D/3D display selection for BG0; bits [d02-d00] relate to setting the background mode.

More specifically, O [d31] is an OBJ Extended Palette flag:

| | |
|---|---|
| 0 | Disable (256 Colors × 1 palette) |
| 1 | Enable (256 Colors × 16 palettes) |

BG [d30] is a BG Extended Palette flag which is valid for BG screens that can be displayed with 256 colors×16 palettes:

| | |
|---|---|
| 0 | Disable (256 Colors × 1 palette) |
| 1 | Enable (256 Colors × 16 palettes) |

More specifically, OBJ and each BG screen can be allocated 256 colors×16 palettes (8 KB) of VRAM by setting the Extended Palette flag in the DISPCNT register and a RAM Bank Control register. When allocated, palette slots are not mapped to the CPU bus. To rewrite the palette data, the palette slot must be allocated to the LCD controller.

BG Screen Base Offset [d29-d27] offset (in 64-KB units) the base address of the screen data set with a BG control register. For character BG, the BG screen composition elements are treated as characters of 8×8 dots. Consequently, character data is required to display the BG. In addition character index data for each 8×8-dot unit is required; this character index data is called screen data. The base address of the BG screen data is calculated as follows:

The value set in the BG control register+(BG screen base offset×0x100000)

An arbitrary base address can be specified from a maximum 512 KB of BG-VRAM space.

BG Character Base Offset [d26-d24] offset (in 64-KB units) the base address of the screen data set with the BG control register. Consequently, the base address of the BG character data is calculated as follows:

The value set in the BG control register+(BG character base offset×0x100000)

An arbitrary base address can be specified from a maximum 512 KB of BG-VRAM space.

OH [d23] is an OBJ processing during H-Blank period flag. When set to 0, the OBJ render process is performed during the entire H-Line period (including the H-Blank period). When set to 1, the OBJ render process is performed only during the display period, but not during the H-Blank period. In this case, the maximum number of OBJ cannot be displayed.

BM [d22] is a VRAM Extended flag for Bitmap OBJ that specifies OBJ-VRAM capacity when 1D mapping is selected for OBJ bitmap data. "0" specifies 128 KB (starting character name boundary of 128 bytes) and "1" specifies 256 KB (starting character name boundary of 256 bytes).

CH [d21-d20] is a VRAM Region Extended Flag for Character OBJ which specifies OBJ-VRAM capacity when OBJ character data uses 1D mapping:

| | |
|---|---|
| 00 | 32 KB (starting character name boundary: 32 bytes) |
| 01 | 64 KB (starting character name boundary: 64 bytes) |
| 10 | 128 KB (starting character name boundary: 128 bytes) |
| 11 | 256 KB (starting character name boundary: 256 bytes) |

For OBJ character data, 8×8 dot sections are treated as basic characters and are assigned a Character Number. The OBJ size can be from 8×8 dots to 64×64 dots (12 different sizes). The OBJ character data are defined as having either 16 colors or 256 colors, so the definition of single basic character requires either 32 bytes or 64 bytes (both have the same format as BG character data).

Display VRAM [d19-d18] selects the VRAM block to display when in a VRAM display mode:

| | |
|---|---|
| 00 | VRAM-A |
| 01 | VRAM-B |
| 10 | VRAM-C |
| 11 | VRAM-D |

Display mode [d17-d16] selects the display mode:

| 00 | Display OFF |
| 01 | Graphics Display |
| 10 | VRAM Display |
| 11 | Main Memory Display |

When the display mode is OFF, the 2D/3D graphics, VRAM display and main memory display are not selected and appear white. Graphics display mode displays both 2D and 3D graphics. VRAM display mode displays the bitmap stored in VRAM. Main memory display mode displays the bitmap data stored in main memory.

Figure 33A:
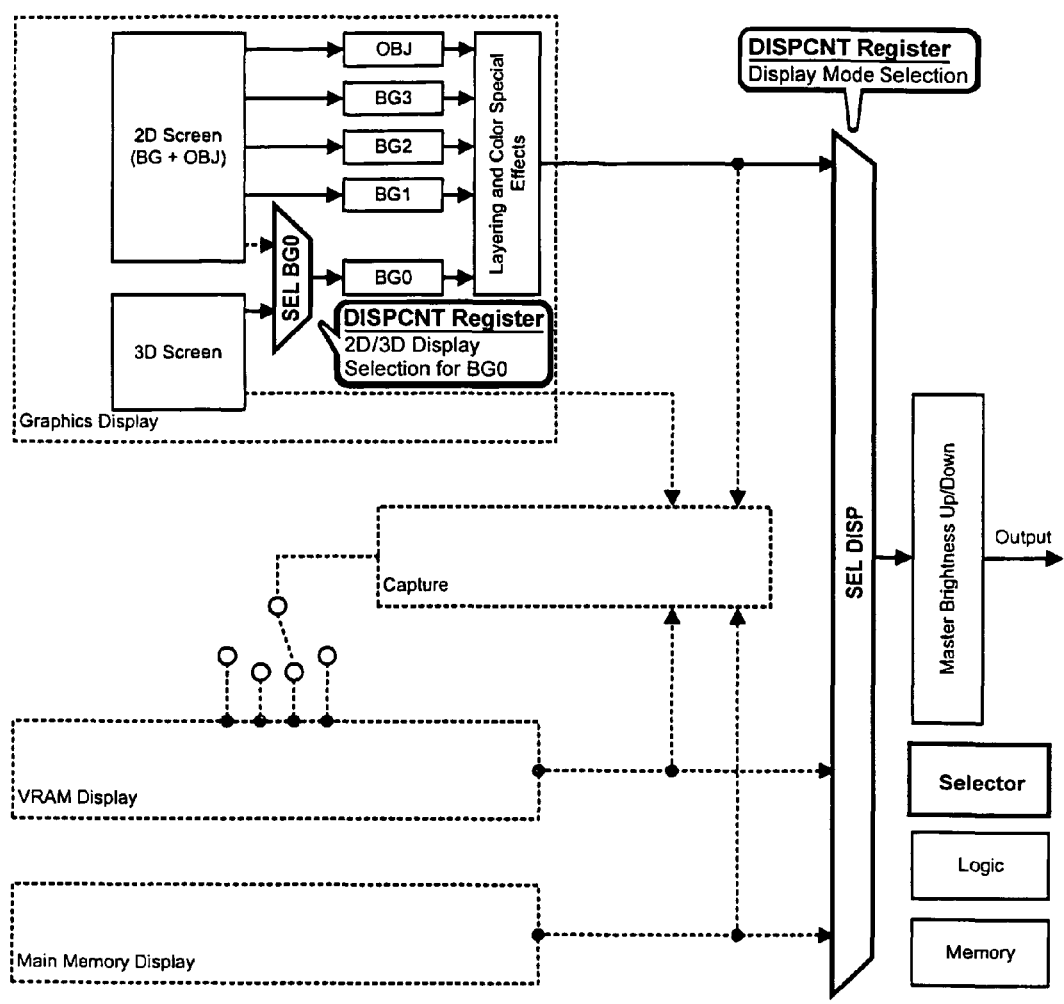
FIGS. 33(a) and 33(b) show example graphics display modes.
Figure 33B:
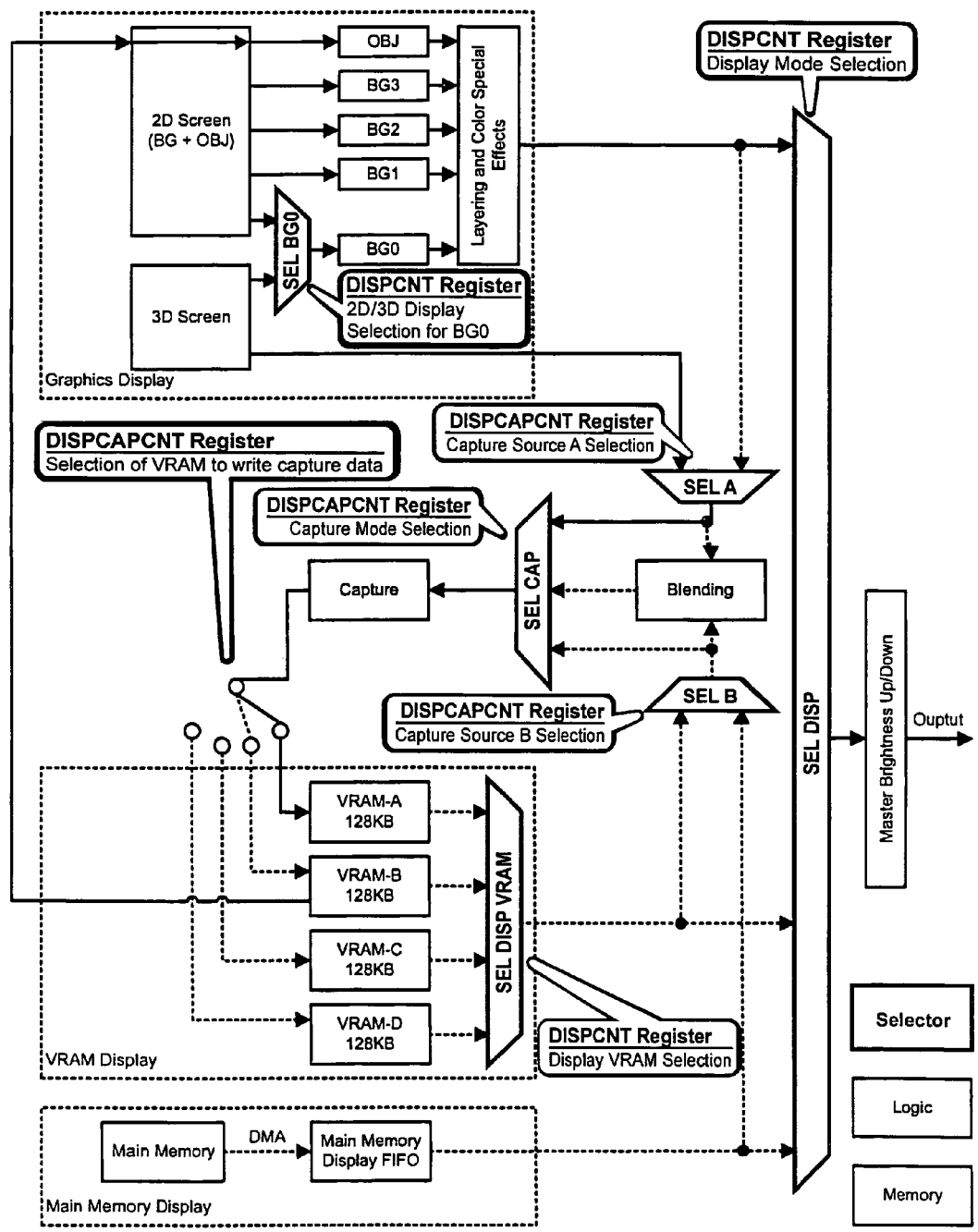

As noted above, graphics display mode displays images generated with 2D and 3D graphics features. FIG. 33(a) show an example graphics display mode in which the results of 3D rendering are layered with a 2D screen and displayed. FIG. 33(b) shows another example graphics display mode in which the results of 3D rendering are pasted in a bitmap OBJ and displayed. The rendering engine's clear alpha value is set to 0 and the 3D rendering result is captured. Then, in the next frame, the VRAM is assigned to a bitmap OBJ. This enables the 3D rendering result to be displayed as an OBJ. At this moment in the sequence, alpha value segments that remain zero in the 3D alpha-blending process are transparent. In this example, double buffering occurs by alternately assigning VRAM-A and VRAM-B to the LCD controller and OBJ-VRAM.

OW [d15] is an OBJ Window Display Enable flag that is set to "0" to disable display of the OBJ window and to "1" to enable display of the OBJ window. To display the OBJ window requires enabling both the OBJ Window Display Enable Flag and the OBJ Display Enable Flag (described below).

W1 [d14] is a Window 1 Display Enable flag that is set to "0" to disable display of Window 1 and is set to "1" to enable display of Window 1.

W0 [d13] is a Window 0 Display Enable flag which is set to "0" to enable display of Window 0 and is set to "1" to enable display of Window 0.

O [d12] is an OBJ Display Enable flag which is disables OBJ display when set to "0" and enables OBJ display when set to "1".

B3 [d11] is a BG3 Display Enable flag for disabling ("0") and enabling ("1") display of BG3.

B2 [d10] is a BG2 Display Enable flag for disabling ("0") and enabling ("1") display of BG2.

B1 [d09] is a BG1 Display Enable flag for disabling ("0") and enabling ("1") display of BG1.

B0 [d08] is a BG0 Display Enable flag for disabling ("0") and enabling ("1") display of BG0.

2D Display Forced Blank [d07] is forcedly halted by the CPU. Because 2D display is halted, 3D graphics using BG0 are not displayed either. During a forced blank, the 2D graphics circuitry does not access VRAM and the LCD screen is white. However, even during a forced blank, an internal HV synchronization counter continues to run. If the forced blank setting is changed from ON to OFF during a display period of the internal HV synchronization counter, the effect takes placed immediately; if it is changed from OFF to ON, the switch takes place at the start after 3 lines.

BM [d06-d05] specifies the Bitmap OBJ Data Mapping Mode:

| 00 | 2D mapping with 128 Horizontal dots |
| 01 | 2D mapping with 256 Horizontal dots |
| 10 | 1D mapping |
| 11 | Prohibited setting |

CH [d04] indicates the Character OBJ Data Mapping Mode. "0" indicates 2D mapping and "1", indicates 1D mapping. In 2D mapping mode, only up to 32 KB of OBJ-AM VRAM can be referenced. In 1D mapping mode, a capacity of 32 to 256 KB can be set with the OBJ-VRAM Region Extended flag. Accordingly, more OBJ characters can be defined in OBJ-VRAM using 1D mapping mode.

2D/3D Display Selection for BG0 [d03] determines whether to use one of the BG screens (BG0) for 2D graphics or for 3D graphics. In an example implementation, setting [d03] to "0" displays 2D graphics and setting [d03] to "1" displays 3D graphics.

BG Mode [d02-d00] set the background mode number for graphics engine A. The background mode selects the BG types that can be used:

| BG Mode Number | BG0 | BG1 | BG2 | BG3 |
|---|---|---|---|---|
| 0 | Text BG/ 3D BG | Text BG | Text BG | Text BG |
| 1 | Text BG/ 3D BG | Text BG | Text BG | Affine BG |
| 2 | Text BG/ 3D BG | Text BG | Affine BG | Affine BG |
| 3 | Text BG/ 3D BG | Text BG | Text BG | Affine Extended BG |
| 4 | Text BG/ 3D BG | Text BG | Affine BG | Affine Extended BG |
| 5 | Text BG/ 3D BG | Text BG | Affine Extended BG | Affine Extended BG |
| 6 | 3D BG | — | Large Screen 256-Color Bitmap BG | — |
| 7 | | | Prohibited Setting | |

A similar display control register (not shown) may be provided for Graphics Engine B. Using this register, a background mode number may be set for graphics engine B. The background mode selects the BG types that can be used:

| BG Mode Number | BG0 | BG1 | BG2 | BG3 |
|---|---|---|---|---|
| 0 | Text BG | Text BG | Text BG | Text BG |
| 1 | Text BG | Text BG | Text BG | Affine BG |
| 2 | Text BG | Text BG | Affine BG | Affine BG |
| 3 | Text BG | Text BG | Text BG | Affine Extended BG |
| 4 | Text BG | Text BG | Affine BG | Affine Extended BG |
| 5 | Text BG | Text BG | Affine Extended BG | Affine Extended BG |
| 6 | | | Prohibited Setting | |
| 7 | | | Prohibited Setting | |

The 3D BG can display images generated by the 3D graphics engine. It can be displayed with other BG screens according to alpha-blending and priority settings. The 2D graphics engine B cannot use this background type.

The text BG is a character format BG. Text BG is the only BG type that can handle characters defined in 16 colors and control VRAM consumption, but it cannot accommodate affine transformations.

The affine BG is a character format BG that can accommodate affine transformations. It cannot perform character-unit processes such as HV flips.

Affine extended BG are of three types: Character BG that can use 256 colors×16 palettes; 256-Color Bitmap BG; and Direct Color Bitmap BG that can specify color directly.

Large-Screen 256-Color Bitmap BG makes full use of the maximum capacity of BG-VRAM (512 KB). As such, it cannot be used other BG's. However, it can be used together with a 3D screen. 2D graphics engine B cannot use this BG type.

The illustrative portable game system can handle two types of OBJ: Character OBJ and Bitmap OBJ.

Figure 26D:
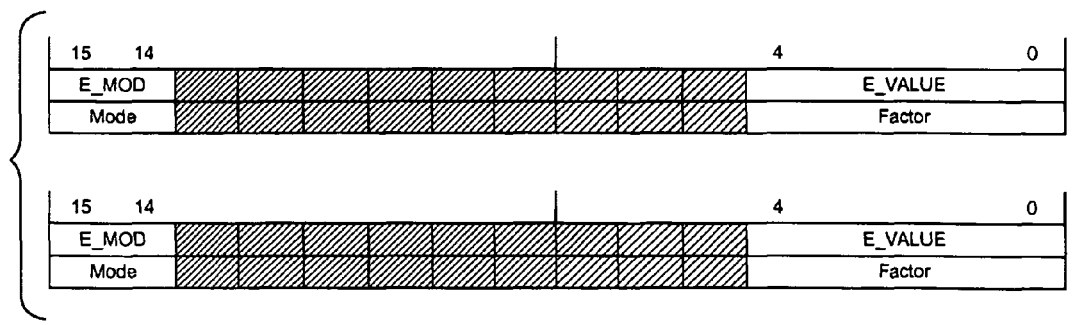

Another register MASTER_BRIGHT is shown in FIG. 26(d). The configuration of this register handles the brightness up/down process for Image Output A. This register is a read/write register and is located, by way of example, at address 0x0400006C in the address space of the CPU core. A similar register (shown below the first register) handles the brightness up/down process for Image Output B.

E_MOD [d15-d14] sets the mode for processing brightness up/down:

| 00 | No change in brightness |
| 01 | Increase brightness |
| 10 | Decrease brightness |
| 11 | Setting prohibited |

E_VALUE [d04-d00] sets the factors as calculated below:

1. Brightness Up Computation $Rout=Rin+(63-Rin)\times(E\_VALUE/16)$ $Gout=Gin+(63-Gin)\times(E\_VALUE/16)$ $Bout=Bin+(63-Bin)\times(E\_VALUE/16)$ 2. Brightness Down Computation $Rout=Rin-(63-Rin)\times(E\_VALUE/16)$ $Gout=Gin-(63-Gin)\times(E\_VALUE/16)$ $Bout=Bin-(63-Bin)\times(E\_VALUE/16)$ The result of the Brightness Up and Down computation (Rout, Gout and Bout) is rounded to the nearest integer.

Figure 26E:
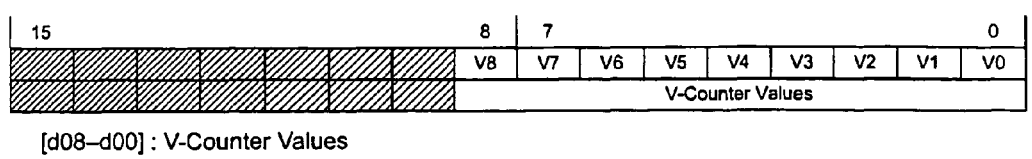

Another register VCOUNT is shown in FIG. 26(e). This register is a read/write register and is located, by way of example, at address 0x04000006 in the address space of the CPU core. When read, V-Counter-Values [d08-d00] specify which of the LCD's total 263 lines is currently displayed. The readout value is between 0 and 262. If the readout value is between 0 and 191, images are being drawn. If the value is between 192 and 262, it is a V-Blank period.

Written values to the VCOUNT register are reflected when the hardware's V-Counter is updated. By using this register, cycles of all portable game devices can be synchronized by adjusting the V-count value when communicating among multiple portable game devices. When writing, it is preferable to confirm that the current value of the V-Counter is between 202 and 212, and only values in this range should be written to the register.

Figure 26F:
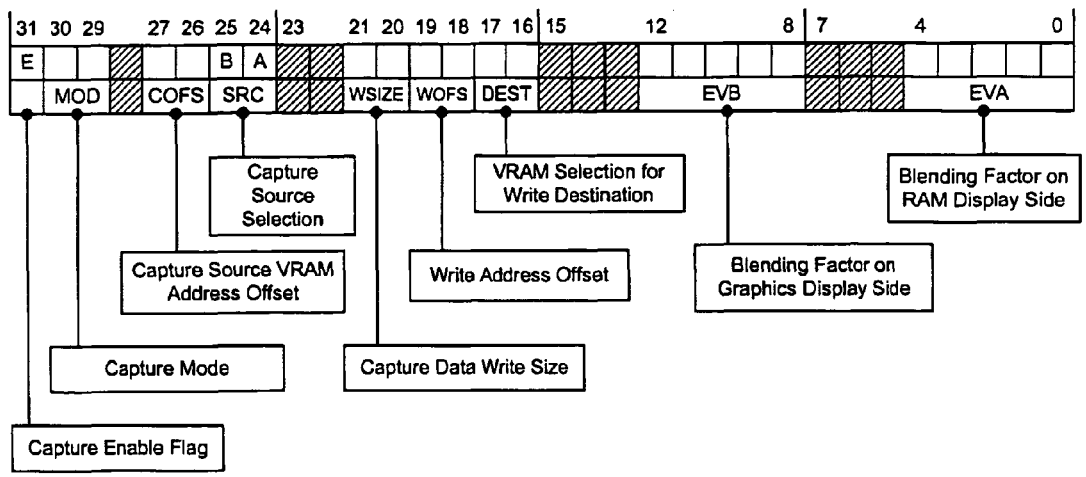

Another register DISPCAPCNT (Display Capture Control Register) is shown in FIG. 26(f). This register is a read/write register and is located, by way of example, at address 0x04000064 in the address space of the CPU core. This register is associated with display capture which enables 2D and 3D graphics and image output from VRAM and main memory to be read into VRAM. Only the image output on the Display Output A side (the 2D graphics engine) can be captured. The display capture feature also enables images from two sources to be blended and then captured.

E[d31] is a Display Capture Enable flag. When the flag is set to "1", one screen's worth of data is captured from the next 0 line, and then the flag is set to "0".

MOD[d30-d29] specifies the capture mode:

| 00 | Capture data from source A |
| 01 | Capture data from source B |
| 10 | Capture the result of |
| 11 | blending data from sources A and B |

COFS[d27-d26] specify the Read Address Offset for Capture Data Source VRAM. This register is invalid in VRAM display mode. If the offset exceeds 0x20000 during reading, the reading continues after wrapping to address 0x00000.

| 00 | 0x00000 |
| 01 | 0x08000 |
| 10 | 0x10000 |
| 11 | 0x18000 |

SRC[d25-d24] specify the Capture Data Source Selection. B[d25] is "0" for VRAM and "1" for Main Memory. A[d24] is "0" for graphics display screen (after 3D/2D blending) and "1" for the 3D screen.

WSIZE[d21-d20] specifies the size when writing the capture data. With RAM captures, one line is always read as a 256-dot image, so no blending and then capturing can occur when the setting is 128×128 dots.

| 00 | 128 × 128 dots (0x08000 bytes) |
| 01 | 256 × 64 dots (0x08000 bytes) |
| 10 | 256 × 128 dots (0x10000 bytes) |
| 11 | 256 × 192 dots (0x18000 bytes) |

WOFS[d19-d18] specify the Address Offset for Capture Data Write. This can specify the offset value for the address where data is written in the specified VRAM. If the offset exceeds 0x20000 during writing, the writing continues after wrapping to address 0x00000.

| 00 | 0x00000 |
| 01 | 0x08000 |
| 10 | 0x10000 |
| 11 | 0x18000 |

DEST[d17-d16] specifies the Capture Data Write Destination VRAM selection. The write destination VRAM must be allocated to the LCD controller.

| | |
|---|---|
| 00 | VRAM-A |
| 01 | VRAM-B |
| 10 | VRAM-C |
| 11 | VRAM-D |

EVB[d12-d08] and EVA[d04-d00] are blending factors for capture sources A and B. The calculation method is described below.

In VRAM display mode, the VRAM block for display VRAM and for writing the captured image data can be the same.

The capture data format is shown in FIG. 28. Although 3D graphics are output in R:G:B=6:6:6 color, because capture occurs in R:G:B=5:5:5 color (employing the upper 5 bits), the image gradient may become a little coarse.

FIG. 29 shows the LCD pixel map of the capture data when the capture size is 256×192 dots.

The calculation of the data to write is as follows.

1. For data captured from source A:

$$CAP=Ca$$

Capture source A's alpha value is used for the alpha value.

2. For data captured from source B:

$$CAP=Cb$$

Capture source B's alpha value is used for the alpha value.

3. For capturing data blended from sources A and B:

$$CAP=[(Ca \times Aa \times EVA)+(Cb \times Ab \times EVB)]/16$$

The alpha value is one when EVA is non-zero and capture source A's alpha value is one, or when EVB is non-zero and capture source B's alpha value is one. In all other circumstances, the alpha value is zero.

CAP: The color to write (calculation results are rounded to the nearest integer)
Ca: A's capture source data color, EVA: blending factor for A
Cb: B's capture source data color, EVB: blending factor for B
Aa: A's alpha value: A's capture source alpha value
Determined as shown below:

| Capture Source A Selection | 3D Screen Alpha Value | Aa |
|---|---|---|
| 0 | — | 1 |
| 1 | 0 | 0 |
|   | 1–31 | 1 |

When a conflict occurs between access to the display circuit VRAM and access to VRAM from the CPU, the display circuit VRAM access takes precedence. Because the dot clock of the LCD controller is ⅙ of a cycle of the image processing clock and the system clock, the timing of the LCD controller to access the VRAM is once every six cycles. If the VRAM of the capture is being displayed while display capturing, the frequency at which the display circuit accesses the VRAM is doubled, and the VRAM is accessed with a timing of once every three cycles. With this timing, when simultaneously accessing from the CPU, the CPU access must wait one cycle.

Some or all of the above-described system components could be implemented as other than the hand-held system configurations described above.

An emulator system, for example, might include software and/or hardware components that emulate or simulate some or all of hardware and/or software components of the system for which the application software was written. For example, the emulator system could comprise a general-purpose digital computer such as a personal computer, which executes a software emulator program that simulates the hardware and/or firmware of the system. The emulator could also comprise a personal digital assistant (PDA) that simulates the hardware and/or firmware of the system. An emulator may execute the game software so that a particular game functions and/or appears somewhat differently from how it functions and/or appears on its intended platform. Thus, the emulator may show a color game in monochrome or a play a game without its accompanying sound. Emulation as used herein is intended to include emulation that results in these and other such differences in function and appearance.

Some general purpose digital computers (e.g., IBM or MacIntosh personal computers and compatibles) are equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of the system. Emulator software controls the hardware resources on the personal computer platform to simulate the processing, graphics, sound, peripheral and other capabilities of the portable game system platform for which the game programmer wrote the game software. Similarly, PDAs and other hand-held communication devices such as mobile telephones running emulator software may have sufficient performance to approximate the graphics and sound performance of the system.

U.S. Pat. No. 6,672,963 (the contents of which are incorporated herein in their entirety) discloses a software emulator that maintains high-quality graphics and sound in real time across a wide variety of video games and other applications. The emulator disclosed in the '963 patent achieves this through a unique combination of features and optimizations including, for example:

use of a virtual liquid crystal display controller (state machine) to maintain real time synchronization with events as they would occur on the native platform, use of a hardware-assisted bit BLIT memory transfer operation to efficiently transfer graphics information into video memory, pre-computed translation table for translating native platform graphics character formats into formats more compatible with standard graphics adapters, emulation of native platform color palette information to provide compatibility with games and other applications that change color palettes within a frame, emulation of major registers and other hardware-based memory structures within the native platform in RAM under software control, use of a jump table able to efficiently parse incoming binary instruction formats, use of a unique page table to control memory access by remapping memory access instructions into different memory locations and/or function calls, availability of a ROM protection function to eliminate ROM overwriting during emulated operations, responsive to video game compatibility modes and registration data, models native platform using state machine defining search, transfer, horizontal blank and vertical blank states, cycle counter to determine when a modeled state has expired and transition to a new state is desired, selective frame display update skipping while maintaining execution of all instructions to maintain state information while minimizing game play slowdowns, optional NOP loop look ahead feature to avoid wasting processing time in NOP loops, redundant emulated RAM and ROM storage to optimize execution efficiency, separate page tables for read and write operations, modeling of native microprocessor registers as a union of byte, word and long register formats, modeling native instruction CPU flags to allow efficient updating after operations are performed by target platform microprocessor, mapping emulated program counter into target platform microprocessor general purpose register, reads and writes via index register go through pointer tables to increase execution efficiency, adaptable input controller emulator to provide user inputs from a variety of different user input devices, emulated object attribute memory, and use of screen memory buffers larger than screen size to increase paging efficiency by eliminating clipping calculations and using the hardware BitBlt to transfer a subset of the memory buffer to displayed video memory.

It will be recognized that some or all of the various features and optimizations described in the '963 Patent are applicable to emulate the example portable game systems described herein.

As described below, an emulator for the example portable game system described above may run on a hand-held computing system such as a PDA or a hand-held communication device such as a mobile telephone. Such devices typically have a single display screen and thus the emulator will need to determine how to present Display Output A and Display Output B (see, e.g., FIG. 25) on this single display screen.

For example, the emulator could effectively divide the single display screen into two display areas and respectively provide Display Output A and Display Output B in each of these display areas. These display areas need not be the same size and the emulator may provide the "main" display output to a larger one of the display areas.

In still other instances, the emulator may provide only one of the Display Outputs A and B to the screen of the hand-held computing system or hand-held communication device. The one output that is provided to the screen need not be the same throughout the game. Thus, for example, Display Output A may be provided at some times and Display Output B may output at other times.

In addition, the display area on the single display screen for Display Output A and the display area on the single display screen for Display Output B may be oriented differently (e.g., one horizontally oriented and the other vertically oriented). This may facilitate display of the two Display Outputs at the same time.

In other instances, one of the Display Outputs A and B may be provided to the screen while the other one is made to be accessible upon supplying a predetermined input or inputs to the hand-held computing system or hand-held communication device. Thus, for example, a player may provide a predetermined input (such as a key press or a touch screen input) to switch between one Display Output and the other.

In addition, as described above, one of the display screens of the example portable game system is touch-sensitive. If the display screen of the hand-held computing system or hand-held communication device is divided into two display areas, the emulator may configure one of the display areas to receive touch inputs during game play. Preferably, this one of the display areas would be the display area displaying the output that would be displayed on the touch screen of the example portable game system. Touch inputs to the other one of the display areas would preferably be ignored.

If the emulator outputs only one of Display Output A and Display Output B at a time to the single screen display of the PDA or hand-held communication device, touch inputs may be supplied by the player when the Display Output to the touch screen of the example portable game system is displayed. If this screen is subsequently switched to the other of the two screens, touch inputs may be ignored.

Because there will likely be differences between the size of the touchscreen of the example portable game system and the size of the screen of the hand-held computing system or hand-held communication device, the emulator will need to appropriately scale the touch screen inputs.

An emulator of the example portable game systems may implement some or all of the following:

flipping back and forth between displays for each of the two screens of the original platform frame skipping to keep up with display emulation of two processors (e.g., ARM7 and ARM9 cores)

emulation of touch screen of original platform with target platform touch screen (including, e.g, conversion or scaling for differently sized screen)

emulation of some or all of the graphics pipeline (even if the target platform has some hardware graphics capability, the emulator may provide some conversion from the original platform graphics API to the target platform graphics API)

Figure 32A:
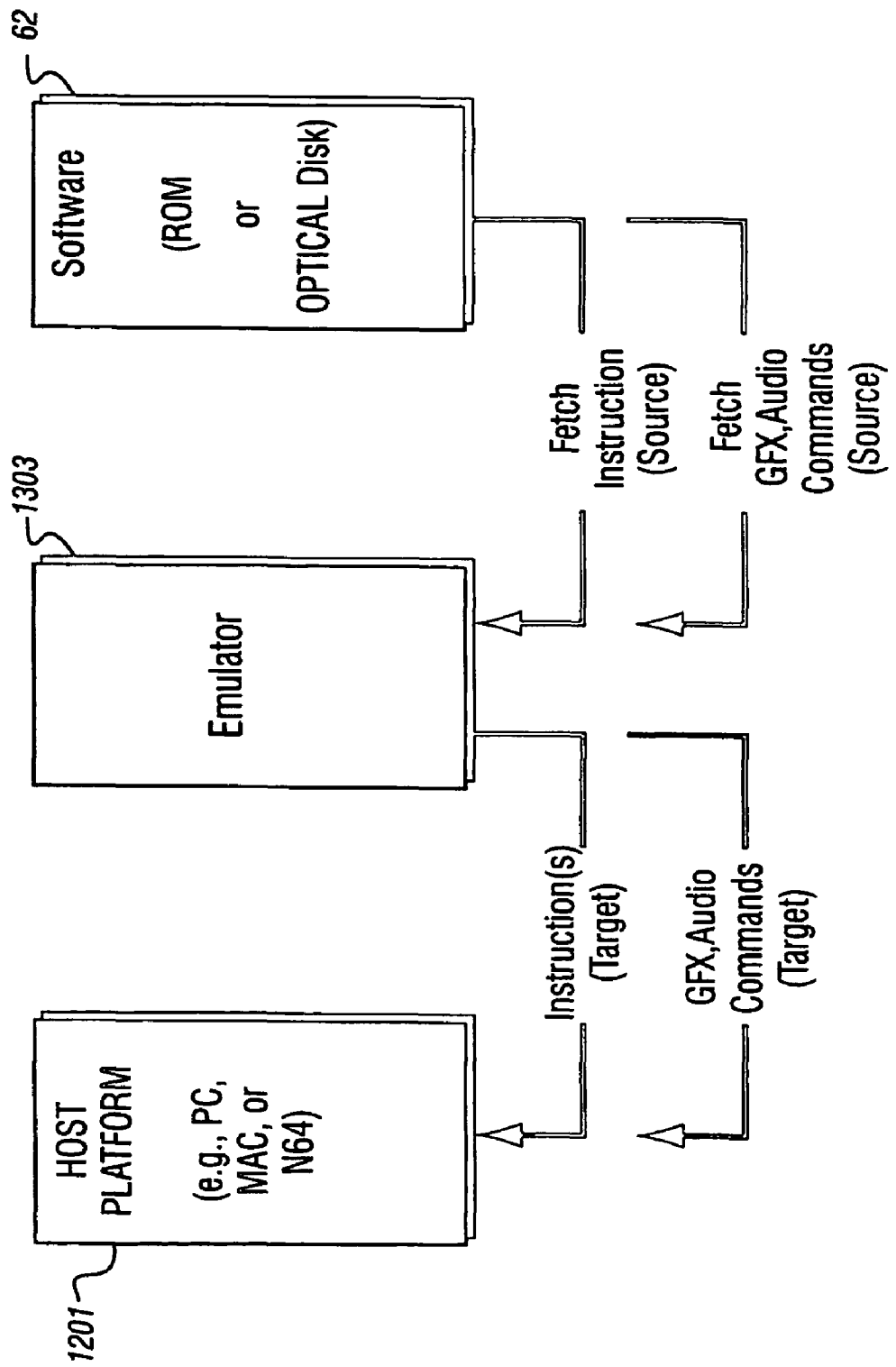
FIGS. 32(a)-32(c) show example alternative compatible implementations.

FIG. 32A illustrates an example overall emulation process using a host platform 1201, an emulator component 1303, and a game software executable binary image provided on a storage medium 62. Host 1201 may be a general or special purpose digital computing device such as, for example, a personal computer, a laptop computer, a palm-top computer, a video game console, a portable game system, a personal digital assistant, an internet appliance, a set-top box, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by portable game system 10 from storage medium 62 and converts these program instructions to a target format that can be executed or otherwise processed by host 1201.

As one example, in the case where the software is written for execution on a platform using a specific processor and the host 1201 is a personal computer using a different (e.g., Intel) processor, emulator 1203 fetches one or a sequence of binary-image program instructions from storage medium 62 and converts these program instructions to one or more equivalent Intel binary-image program instructions. The emulator 1203 also fetches and/or generates graphics commands and audio commands and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 32B:
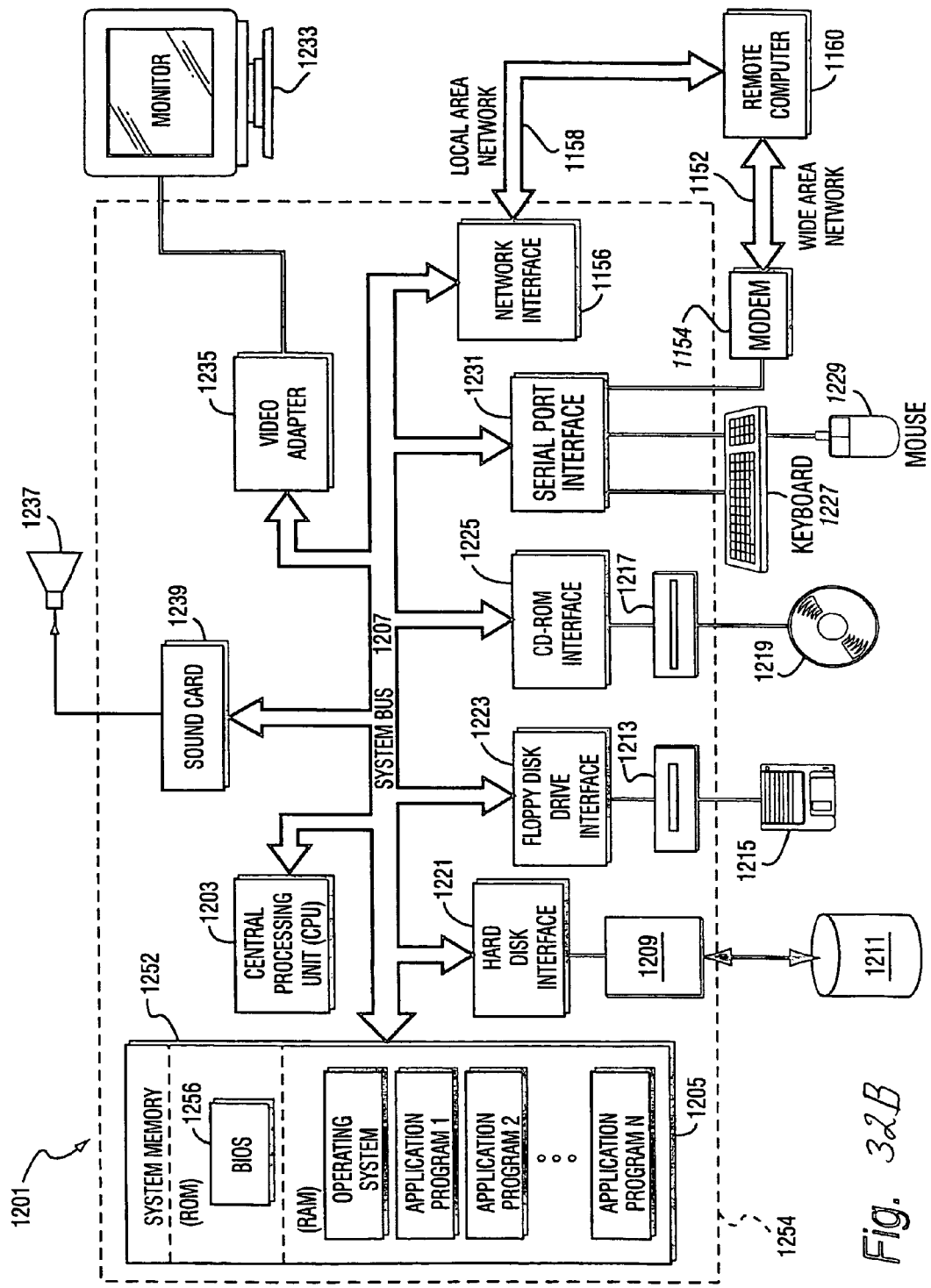

FIG. 32B illustrates one example emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209, magnetic disk drive 1213, and optical disk drive 1217 are connected to system bus 1207 by a hard disk drive interface 1221, a magnetic disk drive interface 1223, and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port, Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 1305.

Figure 32C:
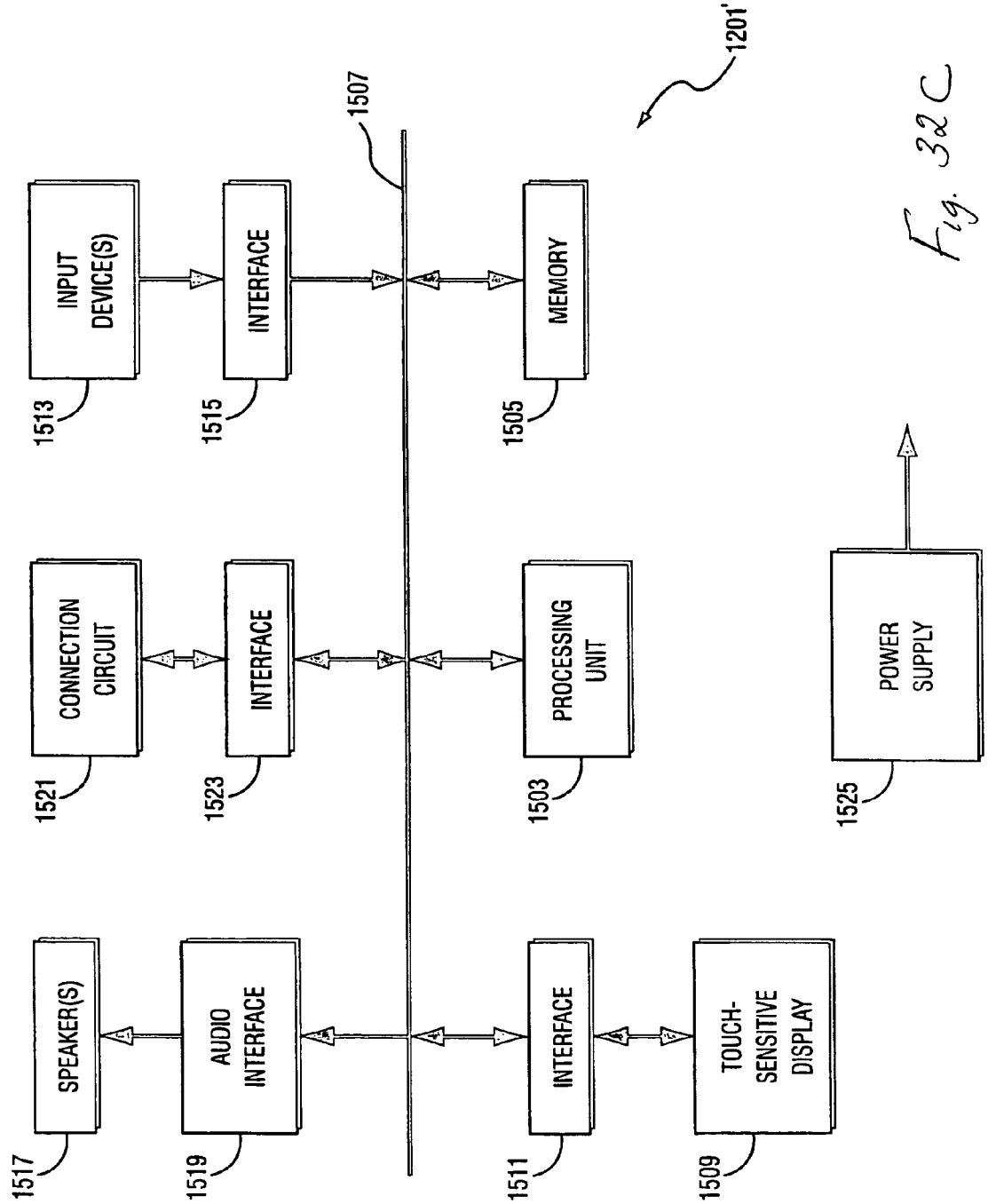

FIG. 32C illustrates another example emulation host system 1201' suitable for use with emulator 1303. The emulation host system in FIG. 30C is generally configured along the lines of a personal digital assistant such as those available from palmOne Inc., Hewlett-Packard, Handspring, Dell, Sony and others and running an operating system such as Windows CE, EPOC, PalmOS, Microsoft Mobile PocketPC, or Windows Mobile. Typically, such personal digital assistants provide capabilities for a diary/scheduler, to-do lists, phone/address books and the like. System 1201' includes a processing unit 1503 and memory 1505. A system bus 1507 couples various system components including memory 1505 to processing unit 1503. Memory 1505 includes read only memory (ROM) and random access memory (RAM). Memory 1505 may also include external memory in the form of memory cards or memory sticks inserted into a suitable port provided in the housing for the components of system 1201'. A touch-sensitive display screen (e.g., a touch-sensitive liquid crystal display screen) 1509 is also connected to system bus 1507 via an interface 1511. Inputs via touch-sensitive screen 1509 are typically made using a stylus. Other input devices 1513 such as pushbuttons, switches, pointing devices and the like are also connected to system bus 1507 via an interface 1515. The input devices may also include external keyboards or game control devices (e.g., joystick, game controller). The input devices may be used as game controls (e.g., starting the game, character movement, character action, etc.) when system 1201' is used with emulator 1303. Games may be written to memory 1505 using communication circuit 1521 which may take the form of a modem for downloading the game from the Internet, for example, or of a cradle (e.g., a USB cradle) for connecting system 1201' to a personal computer.

One or more speakers 1517 are connected to system bus 1507 via an audio interface 1519 to output sounds. A communication circuit 1521 is connected to system bus 1507 via a communications interface 1523 to permit communication with other devices. By way of illustration, communication circuit 1521 may, for example, be a modem and communications interface 1523 may be a serial port. Generally speaking, communication circuit 1521 may be configured for wired or wireless communication in accordance with any conventional communication protocol. A power supply 1525 provides power for the components of system 1201'.

The contents of any technical documents or patent documents referenced above are incorporated herein in their entirety.

As one embodiment of the present invention, the portable game machine having a hardware structure as shown in FIGS. 10 and 11 has been described. However, the present invention is applied not only to the portable game machine having such a hardware structure, but to the one having the above hardware structure achieved by the CPU and software. Also, the portable game machine according to the present embodiment can be emulated by a computer system, such as a personal computer or a portable information terminal. In this case, a game program that causes the computer system to achieve each hardware function of the portable game machine according to the present embodiment is supplied to the computer system. With this, the present invention can be applied also to a general-purpose computer system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. An emulator for execution on a first hand-held system including a first processor, first user controls and a single display, the emulator at least in part emulating the operation of a hand-held second system used to play video games, the second system comprising a second processor, second user controls, and first and second displays, the emulator comprising:

first instructions for execution by the first system to access a memory storing video game program instructions compatible with the second system, wherein the video game program instructions are for a video game program in which game images are displayed on both the first and second displays of the second system when the video game program is executed by the second processor and wherein at least some of the video game program instructions stored in the memory are incompatible with the first system;

second instructions for execution by the first system to transform at least some of the video game program instructions stored in the memory that are incompatible with the first system into transformed instructions that are compatible with the first system; and third instructions for execution by the first system to use the transformed video game program instructions in generating game images which are displayed on the single display of the first system and which correspond to the game images displayed on both the first and second displays of the second system when the video game program is executed by the second processor.

2. The emulator according to claim 1, wherein the emulator displays game images for the first display of the second system on a first portion of the single display and game images for the second display of the second system on a second portion of the single display.

3. The emulator according to claim 1, wherein the emulator alternately displays on the single display of the first system game images for the first display of the second system and game images for the second display of the second system.

4. The emulator according to claim 1, wherein the emulator selectively displays game images for the first display of the second system and game images for the second display of the second system based on inputs to the first user controls.

* * * * *